(12) United States Patent
Okada et al.

(10) Patent No.: US 8,411,974 B2
(45) Date of Patent: Apr. 2, 2013

(54) IMAGE PROCESSING APPARATUS, METHOD, AND PROGRAM FOR DETECTING STILL-ZONE AREA

(75) Inventors: Shintaro Okada, Tokyo (JP); Kazuhiko Nishibori, Kanagawa (JP)

(73) Assignee: Sony Corporation, Tokyo (JP)

( * ) Notice: Subject to any disclaimer, the term of this patent is extended or adjusted under 35 U.S.C. 154(b) by 663 days.

(21) Appl. No.: 12/634,866

(22) Filed: Dec. 10, 2009

(65) Prior Publication Data

US 2010/0150462 A1 Jun. 17, 2010

(30) Foreign Application Priority Data

Dec. 16, 2008 (JP) ................................ P2008-319465

(51) Int. Cl.
*G06K 9/36* (2006.01)
(52) U.S. Cl. .................. 382/236; 382/173; 348/441
(58) Field of Classification Search .................. None
See application file for complete search history.

(56) References Cited

U.S. PATENT DOCUMENTS

| | | | | |
|---|---|---|---|---|
| 4,729,021 A * | 3/1988 | Kondo | ................ | 375/240.24 |
| 4,771,331 A * | 9/1988 | Bierling et al. | .......... | 375/240.01 |
| 5,040,060 A * | 8/1991 | Owada et al. | ............ | 375/240.24 |
| 5,166,788 A * | 11/1992 | Lee | ................ | 348/699 |
| 5,949,916 A * | 9/1999 | Chun | ................ | 382/261 |
| 5,973,749 A * | 10/1999 | Ishii et al. | ................ | 348/558 |
| 6,208,385 B1 * | 3/2001 | Konishi et al. | ................ | 348/558 |
| 6,370,192 B1 * | 4/2002 | Pearlstein et al. | ............ | 375/240 |
| 6,947,097 B1 * | 9/2005 | Joanblanq | ................ | 348/558 |
| 7,239,719 B2 * | 7/2007 | Bongiovanni et al. | ........ | 382/103 |
| 7,580,955 B2 * | 8/2009 | Kondo et al. | .......... | 1/1 |
| 7,710,498 B2 * | 5/2010 | Kondo et al. | ................ | 348/441 |
| 7,860,311 B2 * | 12/2010 | Chen et al. | ................ | 382/173 |
| 8,000,393 B2 * | 8/2011 | Tanaka | ................ | 375/240.16 |
| 8,228,316 B2 * | 7/2012 | Yamada | ................ | 345/204 |
| 2005/0185045 A1 * | 8/2005 | Kamariotis | ................ | 348/14.12 |
| 2005/0232357 A1 * | 10/2005 | Hubrich et al. | .......... | 375/240.16 |
| 2005/0253968 A1 * | 11/2005 | Sullivan | .......... | 348/565 |
| 2008/0122738 A1 * | 5/2008 | Yamada | .......... | 345/60 |
| 2009/0195658 A1 * | 8/2009 | Deschamp | .......... | 348/184 |
| 2009/0238408 A1 * | 9/2009 | Ikeda et al. | ................ | 382/103 |

(Continued)

FOREIGN PATENT DOCUMENTS

| | | |
|---|---|---|
| JP | 7-29820 | 1/1995 |
| JP | 11-8799 | 1/1999 |

(Continued)

*Primary Examiner* — Chan S Park
*Assistant Examiner* — Sean Motsinger
(74) *Attorney, Agent, or Firm* — Finnegan, Henderson, Farabow, Garrett & Dunner, L.L.P.

(57) ABSTRACT

An image processing apparatus detecting, from an input image, a still-zone area disposed at an edge of the input image and displaying a same image continuously, the apparatus including: a difference calculation mechanism calculating a difference between pixel values of pixels located at a same position of the input image in different frames with each other for each pixel of the input image; a pixel-motion-information generation mechanism generating pixel-motion information indicating whether there is a change in the pixel values of the pixels of the input image on the basis of the difference; and a first detection mechanism comparing the pixel-motion information of a plurality of the pixels arranged in a first direction in the input image, and detecting a boundary position in the first direction between the still-zone area and an effective area excluding the still-zone area in the input image.

10 Claims, 12 Drawing Sheets

U.S. PATENT DOCUMENTS

| | | | |
|---|---|---|---|
| 2009/0316786 A1* | 12/2009 | Bosma | 375/240.16 |
| 2010/0103313 A1* | 4/2010 | Matsubara | 348/452 |
| 2010/0150462 A1* | 6/2010 | Okada et al. | 382/236 |

FOREIGN PATENT DOCUMENTS

| | | |
|---|---|---|
| JP | 2005151135 A * | 6/2005 |
| JP | 2005-203933 | 7/2005 |
| JP | 2006-229781 | 8/2006 |
| JP | 2006-339737 | 12/2006 |
| JP | 2007-150379 | 6/2007 |

\* cited by examiner

| H_pre | H_cur |             |
|-------|-------|-------------|
| 0     | 0     | NOT UPDATED |
| 0     | 1     | left = x    |
| 1     | 0     | right = x-1 |
| 1     | 1     | NOT UPDATED |

| COMPARISON BETWEEN COORDINATES | OUTPUT VALUE OF left_cur |
|--------------------------------|--------------------------|
| left_cur > left_pre            | left_pre (HOLD)          |
| left_cur ≤ left_pre            | left_cur (UPDATE)        |

TO BE UPDATED

| COMPARISON BETWEEN COORDINATES | OUTPUT VALUE OF right_cur |
|---|---|
| right_cur > right_pre | right_cur (UPDATE) |
| right_cur ≤ right_pre | right_pre (HOLD) |

| V_pre | V_cur | |
|---|---|---|
| 0 | 0 | NOT UPDATED |
| 0 | 1 | up = y |
| 1 | 0 | down = y−1 |
| 1 | 1 | NOT UPDATED | y-COORDINATE

| COMPARISON BETWEEN COORDINATES | OUTPUT VALUE OF up_cur |
|---|---|
| up_cur > up_pre | up_pre (HOLD) |
| up_cur ≤ up_pre | up_cur (UPDATE) |

| COMPARISON BETWEEN COORDINATES | OUTPUT VALUE OF down_cur |
|---|---|
| down_cur > down_pre | down_cur (UPDATE) |
| down_cur ≤ down_pre | down_pre (HOLD) |

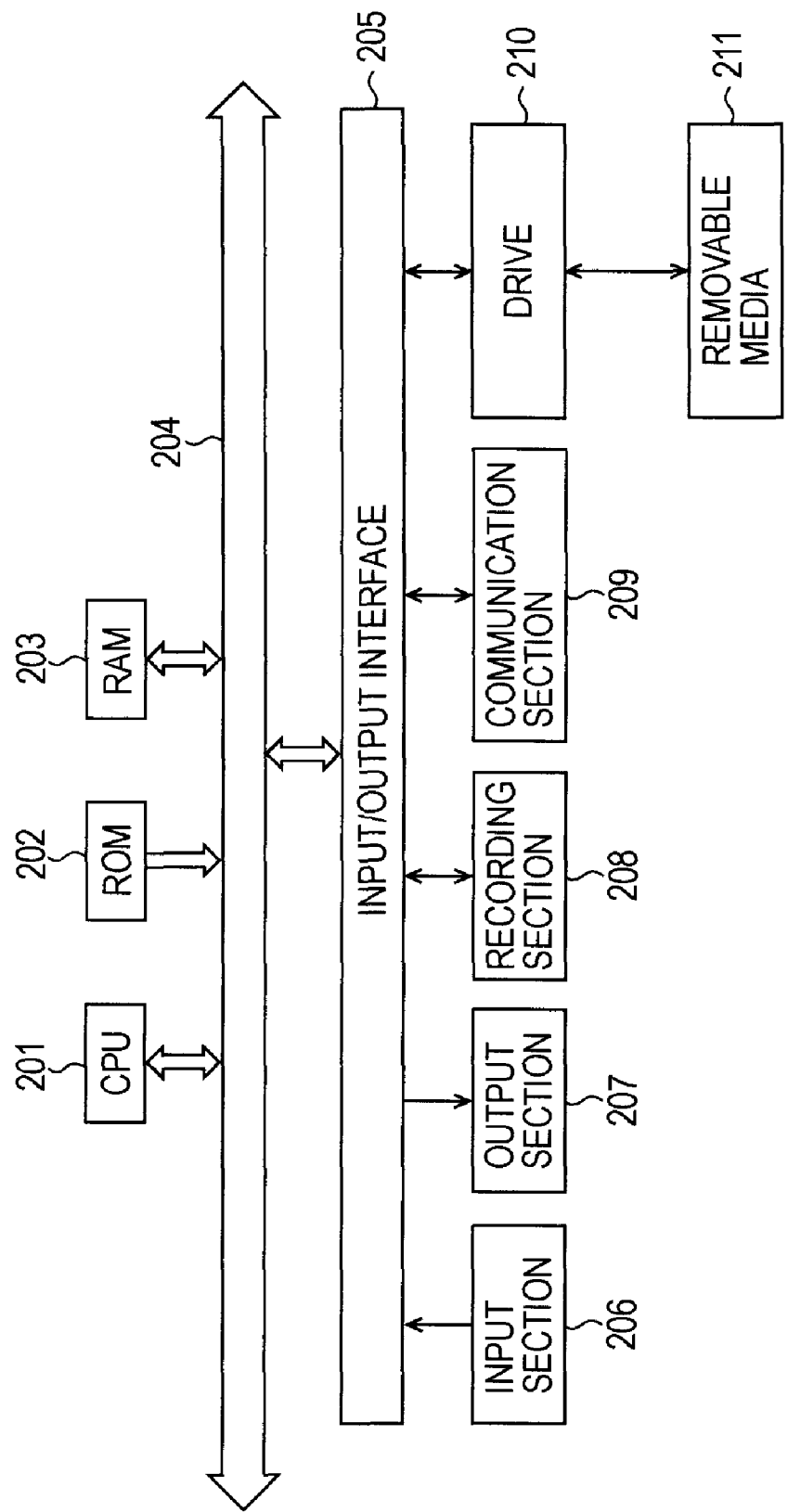

IMAGE PROCESSING APPARATUS, METHOD, AND PROGRAM FOR DETECTING STILL-ZONE AREA

BACKGROUND OF THE INVENTION

1. Field of the Invention

The present invention relates to an image processing apparatus, method, and program. In particular, the present invention relates to an image processing apparatus, method, and program which is suitably used for frame rate conversion.

2. Description of the Related Art

To date, frame-rate conversion processing, in which an interpolated frame is generated between consecutive frames of an image signal so that a frame rate of the image signal is converted, has been widespread. In the frame-rate conversion processing, a motion vector is detected from two frames having different display time, and an interpolated frame is generated by motion compensation using the motion vector.

Incidentally, in a video signal of a content, etc., there are sometimes an area in which a content itself is displayed and a band of area surrounding that area (in the following, called a still-zone area) on an image. In a band of still-zone area disposed at the edge of such an image, a same image, for example, a black image or an image having a design of a predetermined pattern, is continuously displayed. This still-zone area is generally called a black belt, a side panel, a letterbox, etc.

When frame-rate conversion is performed on a video signal of an image including such a still-zone area, if an interpolated frame is generated without considering the still-zone area, detection of motion vectors and motion compensation are performed using the pixels of the still-zone area, thereby deteriorating the image quality of the interpolated frame image. Accordingly, in the frame-rate conversion processing, it is necessary to reliably detect a still-zone area on an image, and to perform detection of motion vectors and motion compensation on a suitable area on the image, that is to say, on an area excluding the still-zone area.

For example, as a method of detecting a still-zone area, proposals have been made on a method of detecting a low-luminance-value area on an image as a still-zone area (for example, refer to Japanese Unexamined Patent Application Publication Nos. 2005-203933 and 2006-229781) and a method of detecting a still-zone area using a correlation of luminance values and frequencies (for example, refer to Japanese Unexamined Patent Application Publication Nos. 7-29820 and 11-8799).

Also, there is a widespread method of detecting a still-zone area by comparing luminance values of pixels in the vicinity of a center of an image and luminance values of pixels around the edge of the image (for example, refer to Japanese Unexamined Patent Application Publication No. 2007-150379). Also, there is a widespread method of detecting a still-zone area by determining whether there is an additional image at the time of decoding an image signal (for example, refer to Japanese Unexamined Patent Application Publication No. 2006-339737).

SUMMARY OF THE INVENTION

However, in the above-described techniques, it has been difficult to reliably detect a still-zone area from an image.

For example, in a method of determining a low-luminance-value area of an image to be a still-zone area, if the still-zone area is a black area, that is to say, a low-luminance-value area, the still-zone area can be detected correctly. However, if the still-zone area has a high-luminance value, it becomes difficult to detect the still-zone area. Also, in a method using a correlation of luminance values and frequencies, it becomes difficult to detect a still-zone area if a change in the luminance value of an image in a predetermined direction is irregular.

Further, in the method of detecting a still-zone area by comparing luminance values of pixels in the vicinity of a center of an image and luminance values of pixels around the edge of the image, even if a pixel selected as a sample is not a pixel of a still-zone area, when the difference in the luminance values of the pixels is small, erroneous detection might occur. Also, in the method of detecting a still-zone area by detecting whether there is an additional image, it has been difficult to detect a still-zone area from a baseband signal after having been decoded.

The present invention has been made in view of such circumstances. It is desirable to make it possible to detect a still-zone area from an image more reliably.

According to an embodiment of the present invention, there is provided an image processing apparatus detecting, from an input image, a still-zone area disposed at an edge of the input image and displaying a same image continuously, the apparatus including: a difference calculation means for calculating a difference between pixel values of pixels located at a same position of the input image in different frames with each other for each pixel of the input image; a pixel-motion-information generation means for generating pixel-motion information indicating whether there is a change in the pixel values of the pixels of the input image on the basis of the difference; and a first detection means for comparing the pixel-motion information of a plurality of the pixels arranged in a first direction in the input image, and detecting a boundary position in the first direction between the still-zone area and an effective area excluding the still-zone area in the input image.

The image processing apparatus may further includes: a line-motion-information generation means for generating line-motion information indicating whether there is a change in a pixel value of a pixel constituting a line including pixels arranged in the first direction in the input image; and a second detection means for comparing the line-motion-information of a plurality of the lines arranged in a second direction perpendicular to the first direction in the input image, and detecting a boundary position in the second direction between the still-zone area and an effective area excluding the still-zone area in the input image.

If whether there is a change in the pixel value indicated by each of the pixel-motion information of two adjacent pixels in the first direction is different with each other, the first detection means may detect a position of the two pixels as a position of a boundary in the first direction.

The image processing apparatus may further includes, on the basis of a plurality of positions detected by the first detection means, a first output means for outputting a position nearest to an end of the input image in the first direction out of the plurality of positions as a position of a boundary in the first direction.

If whether there is a change in the pixel value indicated by each of the line-motion information of two adjacent lines in the second direction is different with each other, the second detection means detects a position of the two lines as a position of a boundary in the second direction.

The image processing apparatus may further includes, on the basis of a plurality of positions detected by the second detection means, a second output means for outputting a position nearest to an end of the input image in the second direction out of the plurality of positions as a position of a boundary in the second direction.

The image processing apparatus may further include: a motion-vector detection means for detecting a motion vector from the effective area of the input image on the basis of the boundary position in the first direction and the boundary position in the second direction; and a motion-compensation means for performing motion compensation on the effective area of the input image on the basis of the boundary position in the first direction, the boundary position in the second direction, and the motion vector, and converting a frame rate of the input image.

The image processing apparatus may further include a filter processing means for performing filter processing on a plurality of the boundary positions in the first direction and the boundary positions in the second direction obtained for the input image of each frame, and restraining variations in time of the boundary positions in the first direction and the boundary positions in the second direction.

According to an embodiment of the present invention, there is provided a method or a program of processing an image in an image processing apparatus for detecting, from an input image, a still-zone area disposed at an edge of the input image and displaying a same image continuously, the apparatus including: a difference calculation means for calculating a difference between pixel values of pixels located at a same position of the input image in frames different with each other for each pixel of the input image; a pixel-motion-information generation means for generating pixel-motion information indicating whether there is a change in the pixel values of the pixels of the input image on the basis of the difference; and a detection means for comparing the pixel-motion information of a plurality of the pixels arranged in a predetermined direction, and detecting a boundary position in the predetermined direction between the still-zone area and an effective area excluding the still-zone area in the input image, the method including the steps of: the difference calculation means calculating a difference between pixel values of the pixels of the input image; the pixel-motion-information generation means generating pixel-motion information on the basis of the difference; and the detection means comparing the pixel-motion information of the plurality of the pixels, and detecting a boundary position in the predetermined direction.

In an embodiment of the present invention, in an image processing apparatus for detecting, from an input image, a still-zone area disposed at an edge of the input image and displaying a same image continuously, a difference between pixel values of pixels located at a same position of the input image in different frames with each other is calculated for each pixel of the input image, pixel-motion information indicating whether there is a change in pixel values of the pixels of the input image is generated on the basis of the difference, and the pixel-motion information of the plurality of the pixels arranged in a first direction is compared, and a boundary position in the first direction between the still-zone area and an effective area excluding the still-zone area in the input image is detected.

By an embodiment of the present invention, it is possible to detect a still-zone area from an image more reliably.

BRIEF DESCRIPTION OF THE DRAWINGS

FIG. 18 is a diagram illustrating an example of a configuration of a computer.

DESCRIPTION OF THE PREFERRED EMBODIMENTS

Configuration of Image Processing Apparatus

In the following, a description is given of an embodiment of the present invention with reference to the drawings.

In an image processing apparatus to which the present invention is applied, a still-zone area is detected from an image signal of an input image, and frame-rate conversion is performed using a result of the detection.

Figure 1:
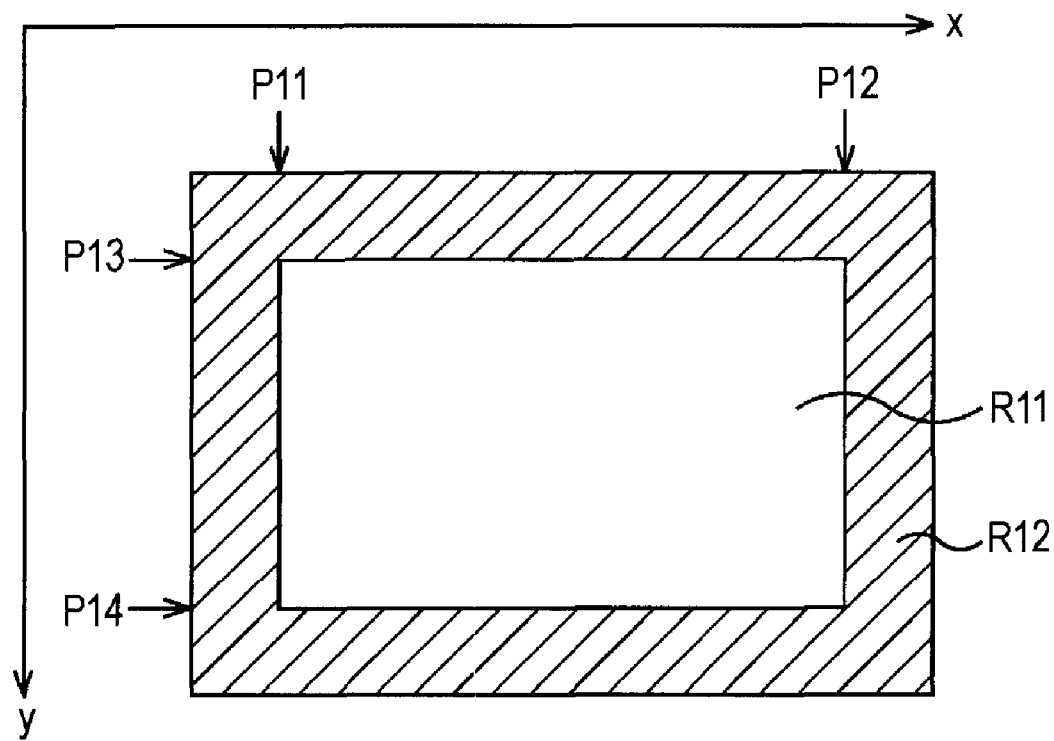
FIG. 1 is an explanatory diagram of an effective area and a still-zone area in an input image.

For example, as shown in FIG. 1, a still-zone area of an input image is a band of area R12 surrounding an area R11 in which an image of a content played back by an image signal is displayed. That is to say, the area R12 is an edge-portion area of the input image. In the area R12, an image of a content itself, such as a moving image, etc., is not displayed, and, for example, a black image having a low luminance value, or an image having a design of a predetermined pattern is continuously displayed. To put it differently, images displayed in the area R12 of the input image in individual frames are the same.

The image processing apparatus detects the area R12, which is the still-zone area on the input image, from input images of different frames in time. Also, the image processing apparatus performs detection of motion vectors and motion compensation on the area R11 excluding the still-zone area to generate an interpolated frame. In this regard, in the following, the area R11 in which the image of a content itself is displayed of the input image is also called an effective area.

The still-zone area is detected by obtaining the x-coordinate and y-coordinate of a boundary position between the area R11 and the area R12 in an xy-coordinate system, for example in the figure, which assumes that a right direction is the x-direction, a down direction is the y-direction, and an origin is the upper left edge of the input image.

Specifically, a position indicated by an arrow P11, namely, the x-coordinate of the leftmost boundary portion of the area R11 and the area R12 in the figure is obtained as the left-coordinate, and a position indicated by an arrow P12, namely, the x-coordinate of the rightmost boundary portion of the area R11 and the area R12 in the figure is obtained as the right-coordinate. To put it differently, the left-coordinate and the right-coordinate are pieces of information identifying the boundary positions between the still-zone area and the effective area in the x-direction in the input image.

Also, a position indicated by an arrow P13, namely, the y-coordinate of the uppermost boundary portion of the area R11 and the area R12 in the figure is obtained as the up-coordinate, and a position indicated by an arrow P14, namely, the y-coordinate of the lowermost boundary portion of the area R11 and the area R12 in the figure is obtained as the down-coordinate. To put it differently, the up-coordinate and the down-coordinate are pieces of information identifying the boundary positions between the still-zone area and the effective area in the y-direction in the input image.

And the left-coordinate, the right-coordinate, the up-coordinate, and the down-coordinate are determined to be the still-zone area coordinates for identifying the still-zone area.

In this regard, an x-coordinate in the xy-coordinate system is determined such that the leftmost position of the input image in the figure is determined to be "0", and an x-coordinate value becomes higher as the position goes rightward in the figure. In the same manner, a y-coordinate in the xy-coordinate system is determined such that the uppermost position of the input image in the figure is determined to be "0", and a y-coordinate value becomes higher as the position goes downward in the figure.

Figure 2:
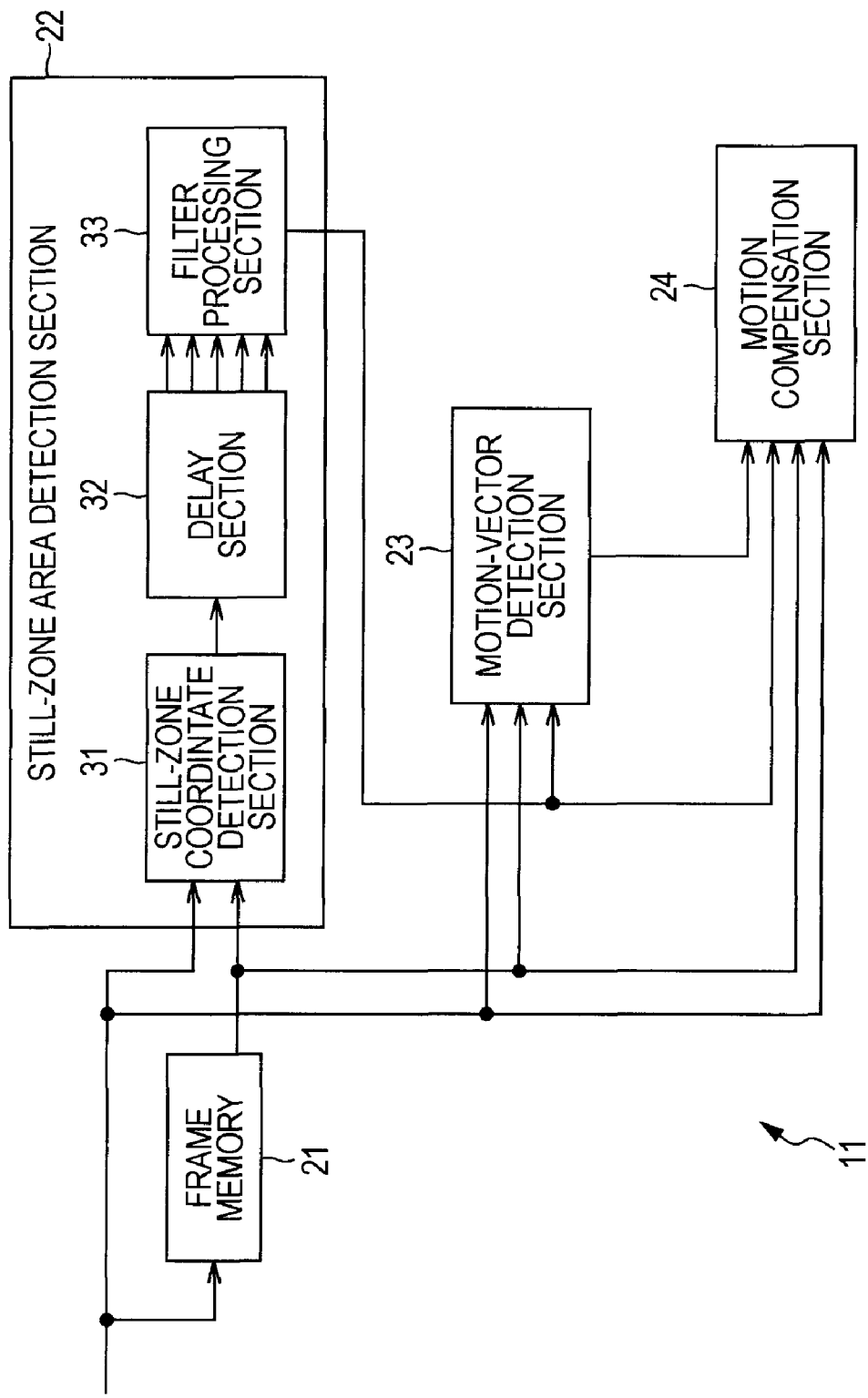
FIG. 2 is a diagram illustrating an example of a configuration of an image processing apparatus according to an embodiment of the present invention.

Next, FIG. 2 is a diagram illustrating an example of a configuration of an image processing apparatus according to an embodiment of the present invention.

The image processing apparatus 11 includes a frame memory 21, a still-zone area detection section 22, a motion-vector detection section 23, and a motion compensation section 24.

An image signal of the input image for each one frame is supplied to each section from the frame memory 21 to the motion compensation section 24 in the image processing apparatus 11. The image signal is, for example, a baseband video signal including a luminance component (Y component) and a color-difference component (a Cr component and a Cb component).

The frame memory 21 delays the supplied input image for one frame, more specifically, the image signal of the input image with a delay of a predetermined time period fixed in advance to the still-zone area detection section 22, the motion-vector detection section 23, and the motion compensation section 24. For example, the delay time of the input image is determined to be a time period for one frame. In this case, the frame memory 21 outputs the input image of one frame before the frame that have been input into the image processing apparatus 11 in time.

In this regard, in the following, the frame, supplied to image processing apparatus 11, to be processed is also called a current frame, and a frame having been output from the frame memory 21 before the current frame in time is also called a past frame. Also, the past frame may be a frame before the current frame in time, and is not necessarily a frame immediately before the current frame.

The still-zone area detection section 22 detects a still-zone area of the input image from the input image of the supplied current frame and the input image of the past frame supplied from the frame memory 21, and supplies the still-zone area coordinates as the detection result to the motion-vector detection section 23 and the motion compensation section 24.

The still-zone area detection section 22 includes a still-zone-area coordinate detection section 31, a delay section 32, and a filter processing section 33.

The still-zone-area coordinate detection section 31 detects still-zone area coordinates of the still-zone area on the input image of the current frame using the input image of the supplied current frame and the input image of the past frame supplied from the frame memory 21, and supplies the coordinates to the delay section 32. That is to say, the still-zone-area coordinate detection section 31 detects a left-coordinate, a right-coordinate, an up-coordinate, and a down-coordinate of the still-zone area as the still-zone area coordinates.

The delay section 32 holds the still-zone area coordinates supplied from the still-zone-area coordinate detection section 31 for a predetermined time period, and supplies the supplied still-zone area coordinates of the current frame and the held still-zone area coordinates for the past four frames to the filter processing section 33.

The filter processing section 33 performs filter processing on the still-zone area coordinates for five frames supplied from the delay section 32 using a 5-tap median filter. The filter processing section 33 supplies the still-zone area coordinates obtained as the result to the motion-vector detection section 23 and the motion compensation section 24 as the final still-zone area coordinates of the current frame.

In this regard, the still-zone area coordinates supplied from the delay section 32 to the filter processing section 33 are not necessarily still-zone area coordinates of consecutive frames, and may be at intervals of one frame. Also, the still-zone area coordinates may be satisfied as long as the coordinates are a plurality of frames. The number of the still-zone area coordinates held in the delay section 32 is determined in accordance with the number of taps of the median filter used by the filter processing section 33 in the filter processing. Further, a filter to be used for the filter processing is not limited to a median filter, but may be a filter obtaining an average value, etc., as long as the filter is a filter for restraining fluctuations of the still-zone area coordinates in time.

The motion-vector detection section 23 detects motion vectors from the effective area in the input image of the supplied current frame and the input image of the past frame from the frame memory 21 using the still-zone area coordinates supplied from the filter processing section 33. The motion-vector detection section 23 supplies the detected motion vectors to the motion compensation section 24.

The motion compensation section 24 performs motion compensation on the effective areas of the effective area in the input image of the supplied current frame and in the input image of the past frame from the frame memory 21 using the still-zone area coordinates from the filter processing section 33 and the motion vectors from the motion-vector detection section 23. And the motion compensation section 24 outputs the image signal of the input image including the interpolated frames obtained by the motion compensation and the supplied frames as the image signal of an output image obtained by the frame-rate conversion.

Figure 3:
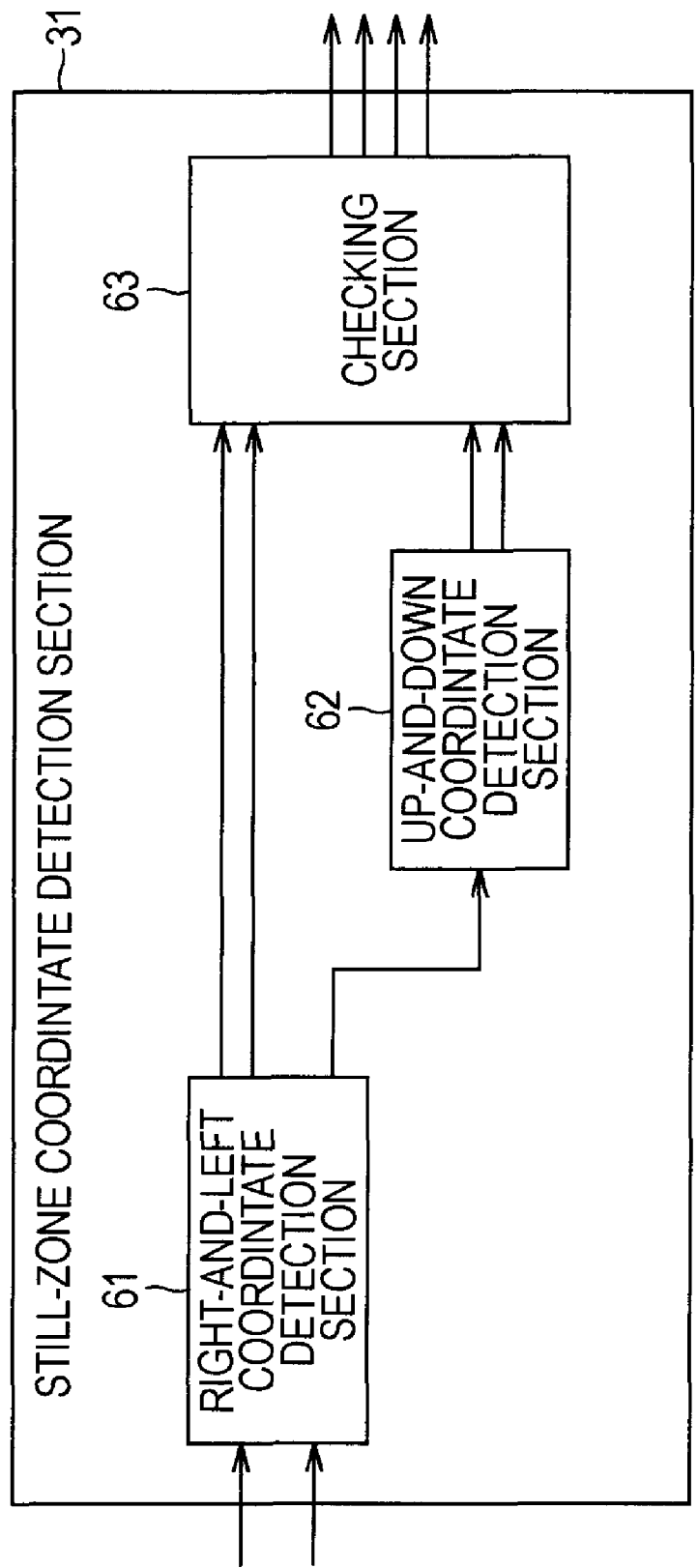
FIG. 3 is a diagram illustrating an example of a more detailed configuration of a still-zone coordinate detection section.

Also, the still-zone-area coordinate detection section 31 in FIG. 2 is configured as shown in FIG. 3 in more detail.

That is to say, the still-zone-area coordinate detection section 31 includes a right-and-left-coordinate detection section 61, an up-and-down coordinate detection section 62, and a checking section 63.

The right-and-left-coordinate detection section 61 operates for each pixel of the input image, detects a left-coordinate and a right-coordinate of the current frame from the input image of the supplied current frame and the input image of the past frame from the frame memory 21, and supplies the coordinates to the checking section 63. That is to say, the right-and-left-coordinate detection section 61 determines a pixel of the input image to be a processing target pixel in sequence to obtain a left-coordinate and a right-coordinate, updates the left-coordinate and the right-coordinate each time a new pixel is to be processed, and supplies the coordinates to the checking section 63.

Also, the right-and-left-coordinate detection section 61 detects motions for individual lines of the input image of the current frame from the input image of the supplied current frame and the input image of the past frame, and supplies a motion flag V-cur for each line as the detection result to the up-and-down coordinate detection section 62.

Here, a line of an input image means a line including pixels of the input image arranged in the x-direction in FIG. 1. A motion for each line means a change in a pixel value of a pixel on a line in the input image.

That is to say, if a pixel value of each pixel constituting a line of interest, which is a line of interest on the input image of the current frame, and a pixel value of each pixel constituting a line, having a same position as the line of interest, of the input image of the past frame are different, it is determined that there has been a motion in the line of interest. Also, if a pixel value of each pixel constituting a line of interest and a pixel value of each pixel constituting a line, having a same position as the line of interest, of the input image of the past frame are the same, it is determined that there has not been a motion in the line of interest. Further, a value of a motion flag for each line, V-cur, is "1" if the line has a motion, and the value of a motion flag is "0" if the line is a still line without a motion.

The up-and-down coordinate detection section 62 operates for each line including pixels of the input image, detects an up-coordinate and a down-coordinate of the input image on the basis of the motion flag, V-cur, supplied from the up-and-down coordinate detection section 61, and supplies the coordinates to the checking section 63. The up-coordinate and the down-coordinate are updated for each line, and are supplied from the up-and-down-coordinate detection section 62 to the checking section 63.

The checking section 63 operates for each frame, holds a left-coordinate and a right-coordinate supplied from the right-and-left-coordinate detection section 61, and updates the left-coordinate and the right-coordinate, held thereby, every time the left-coordinate and the right-coordinate are supplied. Also, the checking section 63 holds an up-coordinate and a down-coordinate supplied from the up-and-down coordinate detection section 62, and updates the up-coordinate and down-coordinate, held thereby, every time the up-coordinate and the down-coordinate are supplied.

The checking section 63 checks the held still-zone area coordinates for each frame of the input image, namely, the left-coordinate, the right-coordinate, the up-coordinate, and the down-coordinate. That is to say, the checking section 63 detects erroneous detection of the still-zone area coordinates, suitably corrects the still-zone area coordinates in accordance with the detection result, and outputs the coordinates to the delay section 32 in FIG. 2.

Figure 4:
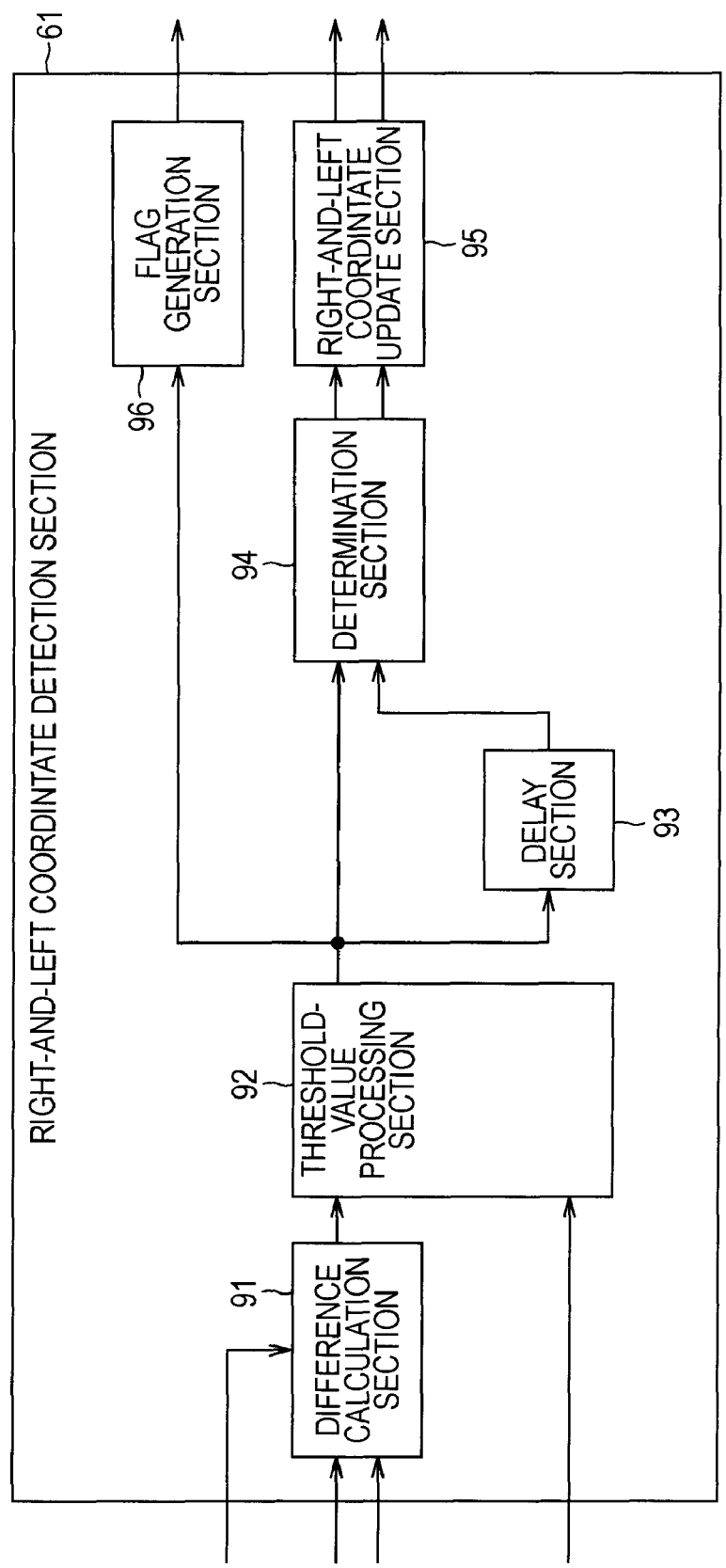
FIG. 4 is a diagram illustrating an example of a more detailed configuration of a right-and-left coordinate detection section.
Figure 5:
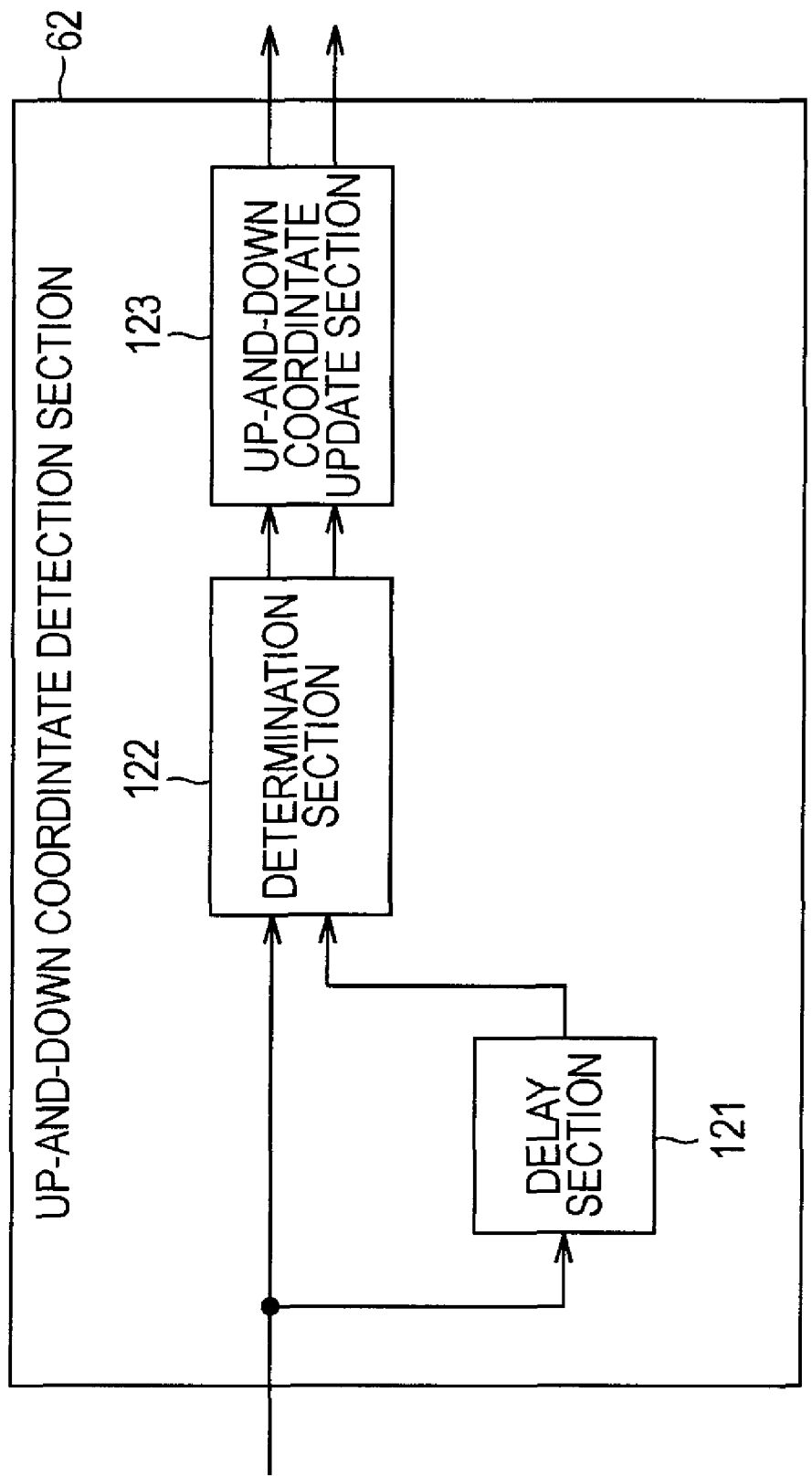
FIG. 5 is a diagram illustrating an example of a more detailed configuration of an up-and-down coordinate detection section.

Also, more specifically, the right-and-left-coordinate detection section 61 and the up-and-down coordinate detection section 62 in FIG. 3 are configured as shown in FIG. 4 and FIG. 5.

FIG. 4 is a diagram illustrating an example of a more detailed configuration of the right-and-left-coordinate detection section 61.

That is to say, the right-and-left-coordinate detection section 61 includes a difference calculation section 91, a threshold-value processing section 92, a delay section 93, a determination section 94, a right-and-left-coordinate update section 95, and a flag generation section 96.

The difference calculation section 91 obtains the absolute difference value between the pixel values of the pixels of the input image of the supplied current frame and the input image of the past frame from the frame memory 21 for each pixel of the input image using a color-difference parameter, and supplies the absolute difference value to the threshold-value processing section 92.

For example, the color-difference parameter indicates whether to obtain absolute difference values of luminance components and color-difference components of pixels of the input image at the time of calculating the absolute difference value or to obtain the absolute difference value of only luminance components, and has either a value "1" or "0". If the color-difference parameter is "1", the absolute difference values of the luminance components and the color-difference components are obtained, and if the color-difference parameter is "0", only the absolute difference value of the luminance components is obtained.

The threshold-value processing section 92 performs threshold-value processing using the absolute difference value of each pixel supplied from the difference calculation section 91 and the supplied threshold value, and generates a motion flag, H-cur, for each pixel.

The motion flag, H-cur, is information indicating whether there has been a motion of the pixels on the input image of the current frame. Here, whether there is a motion of pixel of interest, which is a pixel of interest on the input image of the current frame, is whether there is a change between pixel values of the pixel of interest and of the input image of the past frame having the same position as the pixel of interest, namely, a luminance component or a color-difference component.

For example, if the pixel of interest is a pixel with a motion, that is to say, if the absolute difference value of the pixels of interest is a threshold value or more, the value of the motion flag, H-cur, is "1". Also, if the pixel of interest is a still pixel without a motion, that is to say, if the absolute difference value of the pixels of interest is less than the threshold value, the value of the motion flag, H-cur, is "0".

The threshold-value processing section 92 supplies the generated motion flag, H-cur, for each pixel to the delay section 93, the determination section 94, and the flag generation section 96.

The delay section 93 delays the motion flag, H-cur, supplied from the threshold-value processing section 92 for a processing time period of one pixel, and supplies the flag to the determination section 94. In this regard, in the following, the motion flag for each pixel having a delay of processing time for one pixel is called a motion flag, H-pre. That is to say, the motion flag, H-pre, is the motion flag, H-cur, of the pixel processed immediately before the pixel to be currently processed in time.

The determination section 94 compares the motion flag, H-cur, from the threshold-value processing section 92 and the motion flag, H-pre, from the delay section 93, obtains the left-coordinate and the right-coordinate of the current frame, and supplies the coordinates to the right-and-left-coordinate update section 95. The right-and-left-coordinate update section 95 holds the left-coordinate and the right-coordinate from the determination section 94, updates the held left-coordinate and right-coordinate on the basis of the supplied left-coordinate and the right-coordinate, and supplies the coordinates to the checking section 63.

The flag generation section 96 generates the motion flag, V-cur, for each line on the basis of the motion flag, H-cur, supplied from the threshold-value processing section 92, and supplies the flag to the up-and-down coordinate direction section 62.

Also, FIG. 5 is a diagram illustrating an example of a more detailed configuration of the up-and-down coordinate detection section 62 in FIG. 3.

The up-and-down coordinate detection section 62 includes a delay section 121, a determination section 122, and an up-and-down-coordinate update section 123. The motion flag, V-cur, from the flag generation section 96 in FIG. 4 is supplied to the delay section 121 and the determination section 122.

The delay section 121 delays the motion flag, V-cur, from the flag generation section 96 for processing time of one line, and supplies the flag to the determination section 122. In this regard, in the following, the motion flag for each line having a delay of processing time for one line is called a motion flag, V-pre. That is to say, the motion flag, V-pre, is the motion flag, V-cur, of the pixel processed immediately before the line to be currently processed in time.

The determination section 122 compares the motion flag, V-cur, from the flag generation section 96 and the motion flag, V-pre, from the delay section 121, obtains the up-coordinate and the down-coordinate of the current frame, and supplies the coordinates to the up-and-down coordinate update section 123. The up-and-down coordinate update section 123 holds the up-coordinate and the down-coordinate from the determination section 122, updates the held up-coordinate and down-coordinate on the basis of the supplied up-coordinate and down-coordinate, and supplies the coordinates to the checking section 63.

Operation of Image Processing Apparatus

Incidentally, when an image signal of an input image is supplied to the image processing apparatus 11, the image processing apparatus 11 detects a still-zone area from the input image, and starts frame-rate conversion processing, which generates an interpolated frame using the detection result to convert the frame rate of the image signal.

In the following, with reference to a flowchart in FIG. 6, a description is given of the frame-rate conversion processing by the image processing apparatus 11.

In step S11, the still-zone area detection section 22 performs still-zone-area detection processing using the input image of the supplied current frame and the input image of the past frame supplied from the frame memory 21, and detects still-zone area coordinates of the input image of the current frame. And the still-zone area detection processing section 22 supplies the detected still-zone area coordinates to the motion-vector detection section 23 and the motion compensation section 24. In this regard, a detailed description will be given of the still-zone-area detection processing later.

In step S12, the motion-vector detection section 23 detects motion vectors from an effective area of the supplied input image and the input image from the frame memory 21 using the still-zone area coordinates supplied from the filter processing section 33 of the still-zone-area detection section 22.

For example, the motion-vector detection section 23 detects motion vectors of individual pixels in an effective area of the input image of the past frame by block matching, a gradient method, etc., and supplies the detection result to the motion compensation section 24. That is to say, motion vectors are detected using only pixels in an effective area of the input image of the current frame and the past frame.

In step S13, the motion compensation section 24 performs motion compensation on effective areas of the supplied input image and the input image of the frame memory 21 using the still-zone area coordinates of the filter processing section 33 and the motion vector from the motion-vector detection section 23.

That is to say, the motion compensation section 24 performs motion compensation using only the pixels in effective areas of the input images of the current frame and the past frame so as to generate an output image of an interpolated frame at the time between the current frame and the past frame. For example, the image of the effective area in the output image of the interpolated frame is the image obtained from the motion compensation, and the image of the still-zone area in the output image of the interpolated frame is the image of the portion the still-zone area in the input image of the current frame.

Figure 7:
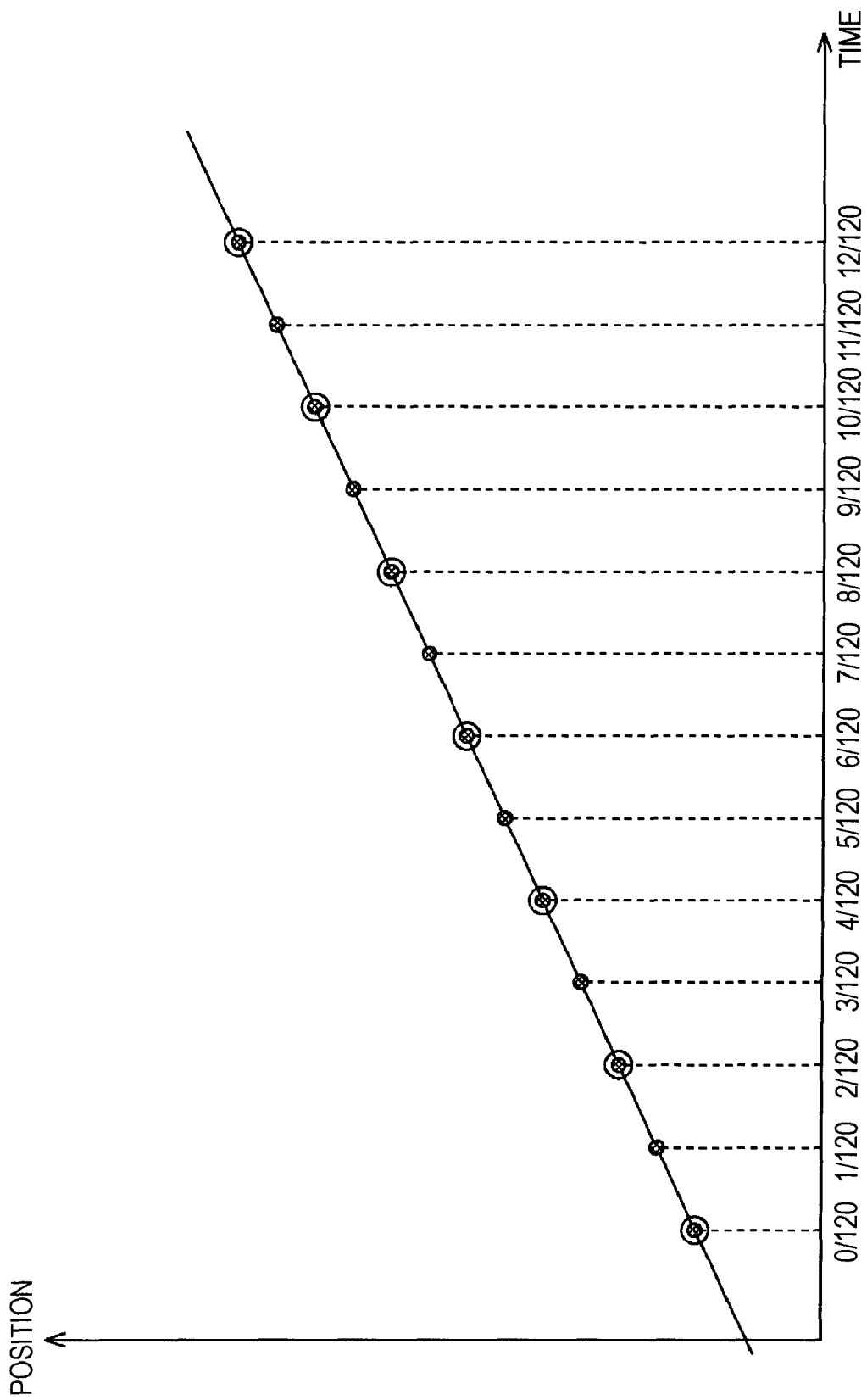
FIG. 7 is an explanatory diagram illustrating an example of frame-rate conversion.

Thereby, for example, as shown in FIG. 7, an input image having a frame rate of 60 Hz is converted into an output image having a frame rate of 120 Hz. In this regard, in FIG. 7, the vertical axis shows a position of an input image or an output image. The horizontal axis shows time, that is to say, display time of each frame. Also, in the figure, a numeric value on the horizontal axis shows time.

Further, an unshaded circle represents a moving body in an input image, and a shaded circle represents a moving body on an output image.

In the example in FIG. 7, two consecutive frames of an input image are used for generating an interpolated frame between the frames. For example, if time 2/120 is assumed to be display time of the current frame, the input image of the current frame and the input image of the past frame at time 0/120 are used to generate an interpolated frame at time 1/120. That is to say, a moving body at time 1/120 is generated as the output image of the interpolated frame at a position on a line connecting the moving body at time 0/120 and the moving body at time 2/120.

Figure 6:
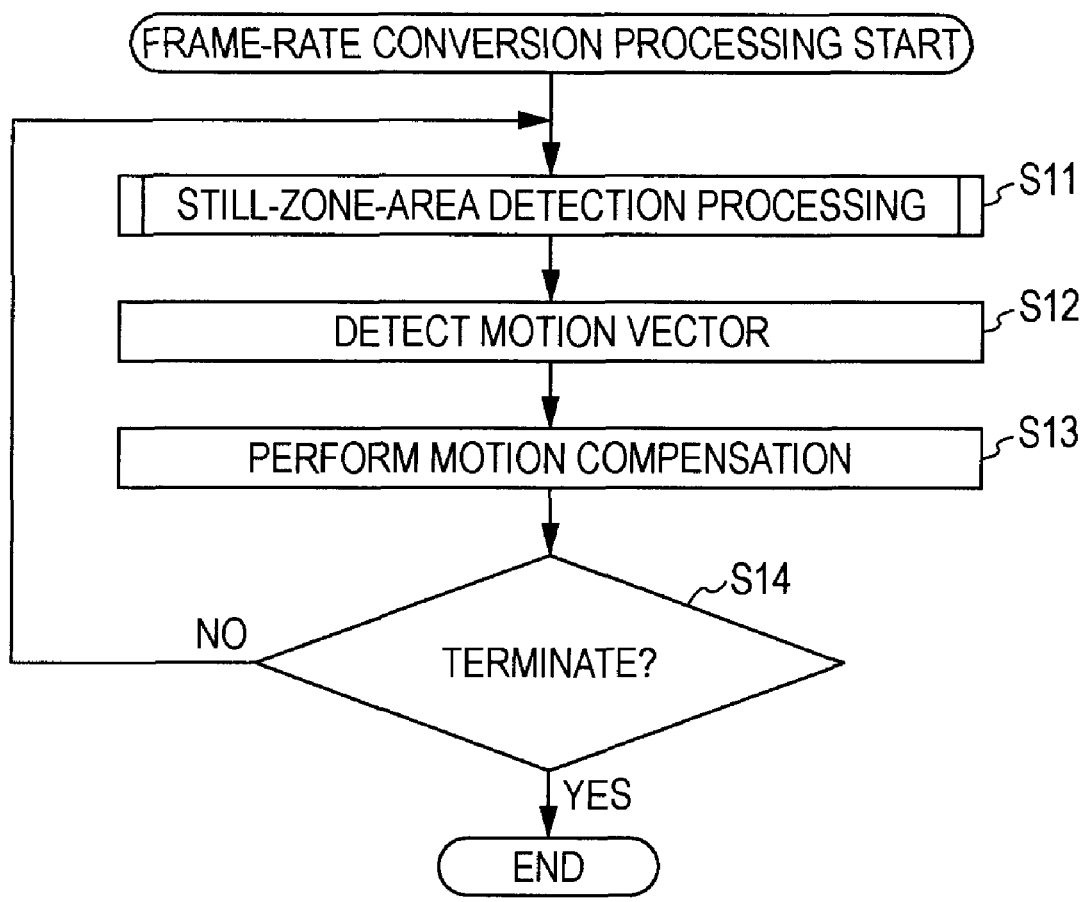
FIG. 6 is a flowchart illustrating frame-rate conversion processing.

Referring back to the description of the flowchart in FIG. 6, the motion compensation section 24 generates an interpolated frame, and then outputs an output image of the generated interpolated frame to the subsequent stage. Also, the motion compensation section 24 outputs the input image of the current frame following the interpolated frame. In this manner, the output interpolated frame and the output image of the current frame are displayed, for example, on a display apparatus connected to the motion compensation section 24. Thereby, the output image is displayed on the display apparatus.

In step S14, the image processing apparatus 11 determines whether to terminate the frame-rate conversion of the image signal of the input image. For example, if the supply of the input image is stopped, and the frame-rate conversion processing is instructed to be terminated, a determination is made to terminate.

In step S14, if determined not to terminate, the processing returns to step S11, and the above-described processing is repeated. That is to say, the next input image becomes the input image of the current frame, and an interpolated frame between the current frame and the past frame is generated.

On the other hand, if determined to terminate in step S14, individual sections of the image processing apparatus 11 terminates the processing in execution, and the frame-rate conversion processing is terminated.

In this manner, the image processing apparatus 11 detects a still-zone area of the input image, and performs detection of motion vectors and motion compensation only on the effective area of the input image using the detection result.

In this manner, detection of motion vectors and motion compensation are performed only on the effective area using the detection result of the still-zone area so that it is possible to restrain deterioration of the image quality of the output image obtained by the frame-rate conversion.

That is to say, if the entire input image is processed without the consideration of a still-zone area at the time of frame-rate conversion of an input image, the pixels in the still-zone area is used by erroneous detection of motion vectors to calculate pixel values of the pixels of the effective area, and thus the image quality of the output image might be deteriorated.

On the other hand, in the image processing apparatus 11, a still-zone area is detected, and detection of motion vectors and motion compensation are performed only on the effective area of the input image, that is to say, using only the pixels of the effective area. Thereby, the image quality of the output image is not deteriorated.

Figure 8:
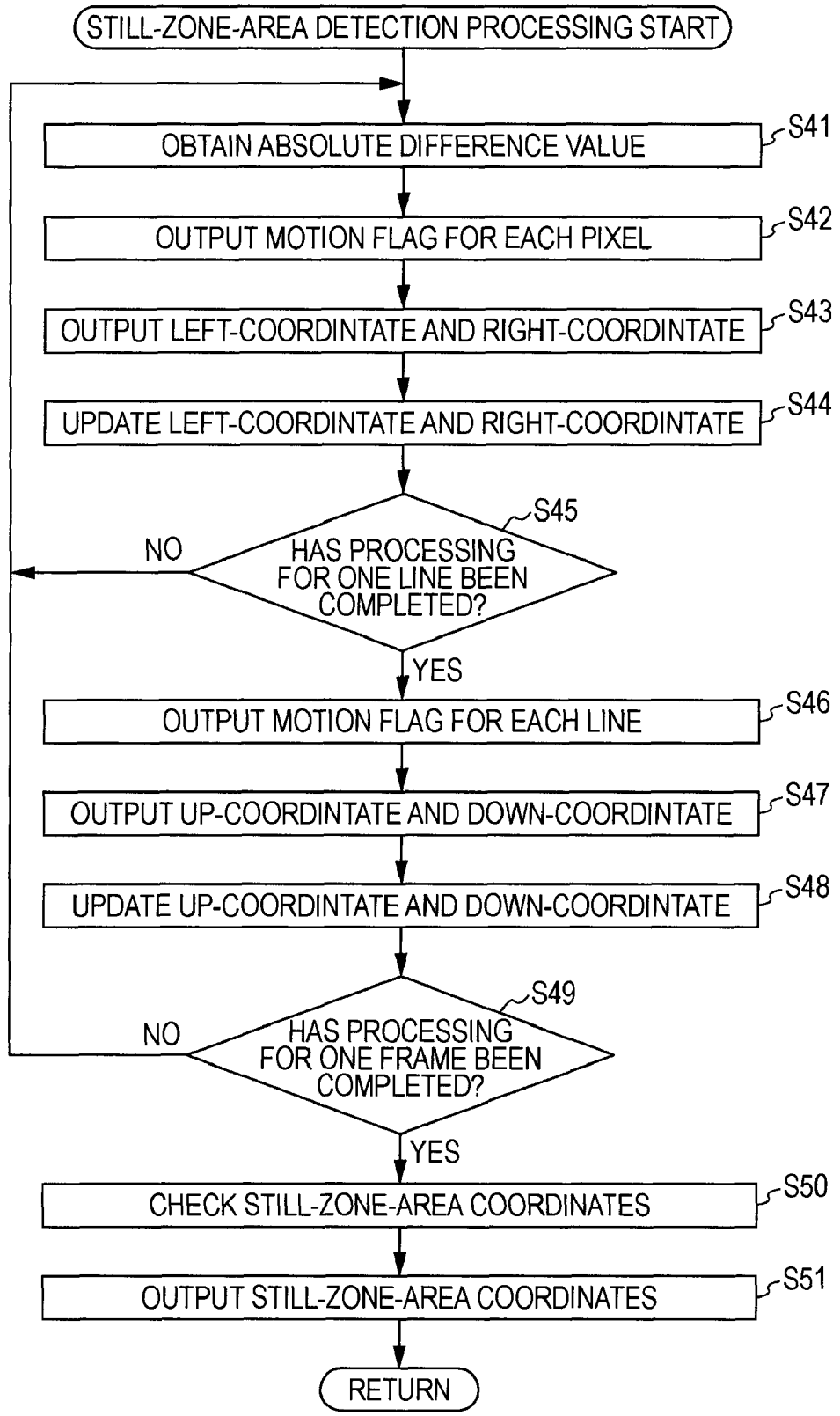
FIG. 8 is a flowchart illustrating still-zone area detection processing.

Next, a description is given of the still-zone-area detection processing corresponding to processing of step S11 in FIG. 6 with reference to a flowchart in FIG. 8.

In step S41, the difference calculation section 91 obtains the absolute difference value of the pixel values of the pixels having a same position on the input images using the input image of the supplied current frame, the input image of the past frame from the frame memory 21, and the supplied color-difference parameter.

For example, the difference calculation section 91 processes each line from the uppermost line to the lowermost line in the figure of the input image in FIG. 1 in sequence in the down direction. Also, the difference calculation section 91 obtains the absolute difference value of individual pixels by assuming the pixels constituting a line to be processed from the leftmost pixel to the rightmost pixel in sequence in the right direction in the figure.

That is to say, a line having a lowest y-coordinate is selected among the lines including a pixel not to be processed in the input image of the current frame, and a pixel having a lowest x-coordinate is selected as a pixel to be processed this time among the pixels, not to be processed, constituting the line.

The difference calculation section 91 obtains the absolute difference value between the pixels of the input image of the current frame to be processed and the pixels of the input image of the past frame having the same position as the pixel. For example, if the supplied color-difference parameter is "1", the difference calculation section 91 obtains the absolute difference value of the luminance-component values (pixel values) between the pixels, and the absolute difference value of the color-difference-component values (pixel values) between the pixels.

Also, if the supplied color-difference parameter is "0", the difference calculation section 91 obtains only the absolute difference value of the luminance-component values (pixel values), and the absolute difference value of the color-difference components is set to "0". In this case, the threshold-value processing section 92 uses substantially only the luminance components of the pixels to determine whether there is a motion for each pixel. In this regard, more specifically, the absolute difference value of Cr components and the absolute difference value of Cb components are obtained as the absolute difference value of the color-difference components.

When the difference calculation section 91 obtains the absolute difference value of a luminance component and the absolute difference value of a color-difference component, the difference calculation section 91 supplies the absolute difference values to the threshold-value processing section 92.

In step S42, the threshold-value processing section 92 performs threshold-value processing using the absolute difference value supplied from the difference calculation section 91 and the supplied threshold value, and outputs an motion flag, H-cur, for each pixel.

Specifically, a threshold value of luminance and a color difference, namely, a threshold value of the Cr component and a threshold value of the Cb component are supplied to the threshold-value processing section 92. The threshold-value processing section 92 compares the absolute difference values of the luminance components and the color-difference components, and obtains the logical sum of the comparison results so as to determine whether there is a motion on the pixel to be processed.

That is to say, if one of the absolute difference values among those of the luminance component, the Cr component, and the Cb component is the threshold value or higher, it is determined that the pixel to be processed had a motion, that is to say, the pixel value has changed. In this case, the threshold-value processing section 92 generates a motion flag, H-cur, having a value of "1" and indicating that the pixel to be processed is a pixel having a motion.

Also, if the absolute difference values of all the components are the threshold values or less, it is determined that the pixel to be processed had not a motion, that is to say, the pixel value has not been changed. In this case, the threshold-value processing section 92 generates a motion flag, H-cur, having a value of "0" and indicating that the pixel to be processed is a still pixel.

In this manner, the threshold-value processing section 92 obtains whether there is a change in the luminance component in a pixel, or in the luminance component and the color-difference component, that is to say, whether there is a change in the pixel value of a pixel by threshold-value determination, and generates a motion flag for each pixel, H-cur, indicating whether there is a change or not.

After the threshold-value processing section 92 generates the motion flag, H-cur, the threshold-value processing section 92 supplies the generated motion flag, H-cur, to the delay section 93, the determination section 94, and the flag generation section 96. Also, the delay section 93 holds the motion flag, H-cur, newly supplied from the threshold-value processing section 92, and supplies the motion flag, H-cur, held up to that time, to the determination section 94 as a motion flag, H-pre.

In step S43, the determination section 94 compares the motion flag, H-cur, from the threshold-value processing section 92 and the motion flag, H-pre, from the delay section 93, and outputs the left-coordinate and the right-coordinate of the input image of the current frame to the right-and-left-coordinate update section 95.

Figures 9, 10, 11:
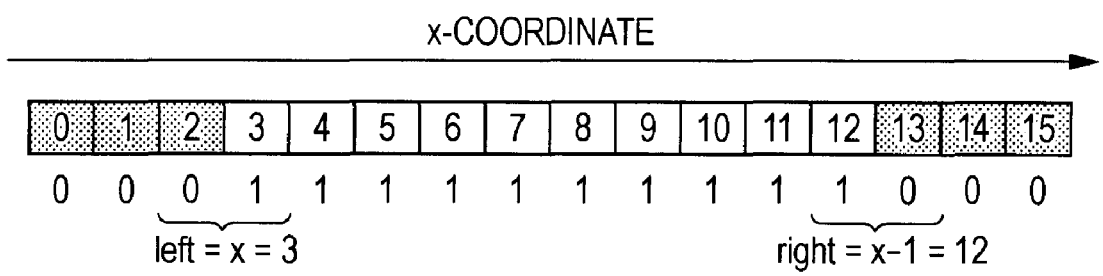
FIG. 9 is a diagram for illustrating detection of right-and-left coordinates.
FIG. 10 is a diagram for illustrating detection of right-and-left coordinates.
FIG. 11 is an explanatory diagram on update of a left-coordinate.

For example, as shown in FIG. 9, the determination section 94 outputs the left-coordinate and the right-coordinate in accordance with states of the motion flag, H-cur, and the motion flag, H-pre, namely, a change in motion of the pixel to be processed. In this regard, in FIG. 9, columns, "H-pre" and "H-cur", show values of the motion flag, H-cur, and the motion flag, H-pre, respectively, and a column at the right side of those columns shows the left-coordinate or the right-coordinate, which are determined by the sates of individual motion flags.

Specifically, the determination section 94 holds the left-coordinate and the right-coordinate held at previous time. In this regard, if the left-coordinate and the right-coordinate have not been output, for example, a maximum value of an x-coordinate on an input image is set as an initial value of the left-coordinate, and a minimum value of an x-coordinate on an input image is set as an initial value of the right-coordinate. That is to say, the initial values of the left-coordinate and the right-coordinate are the rightmost and leftmost x-coordinates in FIG. 1.

If the values of the supplied motion flag, H-cur, and motion flag, H-pre, are "0", the determination section 94 does not update the held left-coordinate and right-coordinate and directly outputs the coordinate values as the left-coordinate and the right-coordinate, held thereby.

Also, if the value of the motion flag, H-pre, is "0", and the value of the motion flag, H-cur, is "1", the determination section 94 holds and outputs the x-coordinate of the pixel to be processed as the left-coordinate, and the directly outputs the value of the held right-coordinate as the right-coordinate. In this case, only the left-coordinate is updated out of the left-coordinate and the right-coordinate held by the determination section 94.

Further, if the value of the motion flag, H-pre, is "1", and the value of the motion flag, H-cur, is "0", the determination section 94 directly outputs the held left-coordinate as a left-coordinate, and holds and outputs a value obtained by subtracting 1 from the x-coordinate of the pixel to be processed as a right-coordinate. In this case, only the right-coordinate out of the left-coordinate and the right-coordinate held by the determination section 94 is updated.

Further, if the values of the motion flag, H-cur, and the motion flag H-pre are "1", the determination section 94 does not update the left-coordinate and the right-coordinate, and directly outputs the held coordinate values as a left-coordinate and a right-coordinate.

Accordingly, for example, as shown in FIG. 10, x-coordinates of boundaries on a line in x-direction between a still-zone area and an effective area are output as a left-coordinate and a right-coordinate for each line arranged in the x-direction of an input image. In this regard, in FIG. 10, the right direction indicates an x-direction, and one quadrilateral represents one pixel constituting a line. Also, a numeric value in each pixel shows an x-coordinate of the pixel, and a numeric value under the pixel indicates a value of the motion flag, H-cur, of the pixel, that is to say, whether there is a motion or not.

In FIG. 10, it is assumed that areas having an x-coordinate of "0" to "2" and an x-coordinate of "13" to "15" are still-zone areas, and an area having an x-coordinate of "3" to "12" is an effective area.

In the still-zone area, a same image is continuously displayed, that is to say, by consecutive frames, and thus the pixels in a still-zone area are still pixels, and the motion flag, H-cur, of the pixel should be "0". On the other hand, in the effective area, the image of a content itself is displayed, and thus the pixels of the effective area are basically pixels with motion, and the motion flag, H-cur, of the pixel should be "1".

Accordingly, a position between a pixel whose motion flag, H-cur, is "0", and the pixel adjacent at the right side to that pixel in the figure, whose motion flag, H-cur, is "1" becomes a boundary position between a still-zone area at the left side in the figure and an effective area at the left side. In the example in FIG. 10, the position between the pixel whose x-coordinate is "2" and the pixel whose x-coordinate is "3" becomes a boundary position between a still-zone area and an effective area.

In the same manner, a position between a pixel whose motion flag, H-cur, is "1", and the pixel adjacent at the right side to that pixel in the figure, whose motion flag, H-cur, is "0" becomes a boundary position between a still-zone area at the right side in the figure and an effective area at the left side. In the example in FIG. 10, the position between the pixel whose x-coordinate is "12" and the pixel whose x-coordinate is "13" becomes a boundary position between a still-zone area and an effective area.

Also, in the input image, a pixel to be processed is selected from a pixel having a low x-coordinate in sequence on a line. Thus, in the figure, the motion flag, H-cur, of the pixel to be processed and the motion flag, H-pre, of the adjacent pixel at the left side to that pixel are supplied to the determination section 94 from the left-end to a rightmost pixel in sequence in the right direction.

Then, if the value of the motion flag, H-pre, is "0", and the value of the motion flag, H-cur, is "1", the determination section 94 determines that the position of the pixel to be processed is a boundary position, and outputs the x-coordinate of the pixel to be processed as a left-coordinate. That is to say, when the motion flag changes from "0" to "1", the boundary of the left-side still-zone area in the figure is determined to be detected. In the example in FIG. 10, x=3 is output as the left-coordinate.

Also, if the value of the motion flag, H-pre, is "1", and the value of the motion flag, H-cur, is "0", the determination section 94 determines that the position of the pixel to be processed is a boundary position, and outputs a value of 1 subtracted from the x-coordinate of the pixel to be processed as a right-coordinate. That is to say, when the motion flag changes from "1" to "0", the boundary of the right-side still-zone area in the figure is determined to be detected.

In the example in FIG. 10, when a pixel having an x-coordinate of "13" is to be processed, the right-side boundary of the still-zone area in the figure is detected. Thus, the value of 1 subtracted from the x-coordinate of the pixel to be processed, namely an x-coordinate of "12", held by the pixel adjacent at the left side to the pixel to be processed, is output as the right-coordinate.

In this manner, the determination section 94 compares the motion flags of two pixels adjacent to each other in the x-direction. If the motion flags indicating whether there is a motion are different with each other, the position between the two pixels is determined as a boundary position between a still-zone area and an effective area in the x-direction on the input image line. And, the determination section 94 outputs a left-coordinate and a right-coordinate indicating the boundary positions to the right-and-left-coordinate update section 95 as a candidate of a left-coordinate and a right-coordinate of the entire input image.

In this regard, there are sometimes pixels without a motion in an effective area. Thus, the positions of those pixels are also output as candidates of the left-coordinate and the right-coordinate. That is to say, a plurality of candidates of the left-coordinate and the right-coordinate may be detected from one line.

Also, more specifically, if the x-coordinate of the pixel to be processed is "0", that is to say, a pixel of a new line is to be processed, the determination section 94 does not compare the motion flags, and directly outputs the held left-coordinate and right-coordinate to the right-and-left-coordinate update section 95. Further, the left-coordinate and right-coordinate held by the determination section 94 is reset to an initial value for each one frame.

Referring back to the description of the flowchart in FIG. 8, in step S44, the right-and-left-coordinate update section 95 updates the held left-coordinate and right-coordinate on the basis of the left-coordinate and the right-coordinate supplied from the determination section 94, and the supplies the updated left-coordinate and right-coordinate to the checking section 63.

For example, the right-and-left-coordinate update section 95 holds the previous left-coordinate and right-coordinate, compares the held left-coordinate and right-coordinate with the left-coordinate and right-coordinate newly supplied from the determination section 94 this time, and updates the held left-coordinate and right-coordinate.

Specifically, as shown in FIG. 11, the right-and-left-coordinate update section 95 updates the left-coordinate in accordance with the comparison between the held left-coordinate and the supplied left-coordinate. In this regard, in FIG. 11, "left-cur" represents a newly supplied left-coordinate, and "left-pre" represents the held left-coordinate by the right-and-left-coordinate update section 95. Also, FIG. 11 shows a left-coordinate output by the comparison between "left-cur" and "left-pre".

That is to say, if the newly supplied left-coordinate, "left-cur", is higher than the left-coordinate held, "left-pre", the right-and-left-coordinate update section 95 outputs the held left-coordinate, "left-pre", to the checking section 63, and continuously holds the left-coordinate, "left-pre".

Also, if the newly supplied left-coordinate, "left-cur", is not higher than the held left-coordinate, "left-pre", the right-and-left-coordinate update section 95 outputs the newly supplied left-coordinate, "left-cur", to the checking section 63, updates the left-coordinate to "left-cur", and holds the left-coordinate, "left-cur". That is to say, the left-coordinate, "left-cur", is held as the next left-coordinate, "left-pre".

Figures 12, 13, 14:
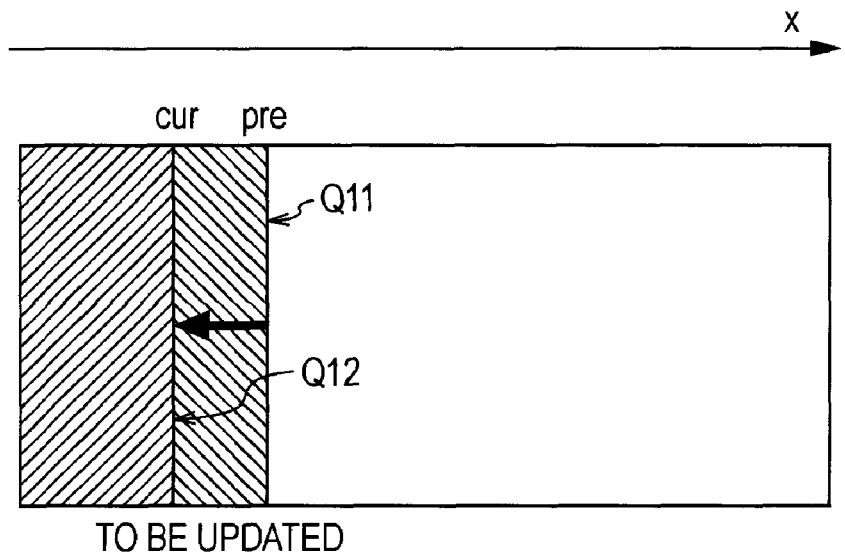
FIG. 12 is an explanatory diagram on update of a left-coordinate.
FIG. 13 is an explanatory diagram on update of a right-coordinate.
FIG. 14 is an explanatory diagram on detection of up-and-down coordinates.

Accordingly, for example, as shown in FIG. 12, if a new left-coordinate less than the held left-coordinate is supplied, the right-and-left-coordinate update section 95 updates the left-coordinate. In this regard, in FIG. 12, the right direction shows the x-direction, and a rectangle in the figure represents an input image.

For example, it is assumed that the right-and-left-coordinate update section 95 holds the x-coordinate of a position shown by an arrow Q11. In this case, if an x-coordinate of a position shown by an arrow Q12 is supplied as a left-coordinate, the right-and-left-coordinate update section 95 updates the left-coordinate the x-coordinate because the x-coordinate is less than the x-coordinate held as the left-coordinate.

The pixels in the still-zone area are pixels without a motion in any frames, and thus one of the pixels adjacent to each other in the still-zone area will not become a pixel with a motion. Accordingly, among the x-coordinates supplied to the right-and-left-coordinate update section 95 as candidates of the left-coordinate, an x-coordinate nearest to the leftmost edge of the input image in the figure has a highest possibility of the left-coordinate indicating a boundary position of the still-zone area. Then, it is possible to more correctly detect a left-coordinate by outputting a candidate of the left-coordinate indicating a lowest x-coordinate as the left-coordinate. That is to say, it is possible to more reliably detect the left-coordinate of the still-zone area.

Further, in the same manner as a left-coordinate, as shown in FIG. 13, the right-and-left-coordinate update section 95 updates the right-coordinate in accordance with the comparison between the held right-coordinate and the supplied right-coordinate. In this regard, in FIG. 13, "right-cur" represents a newly supplied right-coordinate, and "right-pre" represents the right-coordinate held by the right-and-left-coordinate update section 95. Also, FIG. 13 shows a right-coordinate output by the comparison between "right-cur" and "right-pre".

That is to say, if the newly supplied right-coordinate, "right-cur", is higher than the held left-coordinate, "right-pre", the right-and-left-coordinate update section 95 outputs the held right-coordinate, "right-pre", to the checking section 63. And the right-and-left-coordinate update section 95 updates the right-coordinate to "right-cur", and holds the right-coordinate, "right-cur". That is to say, the right-coordinate, "right-cur", is held as the next right-coordinate, "right-pre".

Also, if the newly supplied right-coordinate, "right-cur", is not higher than the held right-coordinate, "right-pre", the right-and-left-coordinate update section 95 outputs the newly supplied right-coordinate, "right-cur", to the checking section 63, and continuously holds the right-coordinate, "right-pre".

In this manner, in the same manner as the case of the left-coordinate, among the x-coordinates supplied to the right-and-left-coordinate update section 95 as candidates of the right-coordinate, the right-and-left-coordinate update section 95 outputs an x-coordinate nearest to the end in the x-direction of the input image as the right-coordinate. Thereby, it is possible to more correctly detect a right-coordinate. That is to say, it is possible to more reliably detect the right-coordinate of the still-zone area.

In this regard, the left-coordinate, "left-pre", and the right-coordinate, "right-pre", held by the right-and-left-coordinate update section 95 are reset for each one frame. That is to say, when all the pixels in the input image of one frame are processed, the right-and-left-coordinate update section 95 discards the held left-coordinate, "left-pre", and right-coordinate, "right-pre". And, the right-and-left-coordinate update section 95 outputs the left-coordinate, "left-cur", and the right-coordinate, "right-cur", of the pixel of the newly supplied next frame, and holds and left-coordinate, "left-cur", and the right-coordinate, "right-cur", as the left-coordinate, "left-pre", and the right-coordinate, "right-pre".

Accordingly, all the pixels in the input image of one frame are to be processed. The left-coordinate and the right-coordinate finally (at the last time) output from the right-and-left-coordinate update section 95 are the coordinates of the boundary candidates of the still-zone area, located at a position, nearest to the end in the x-direction, of the input image of the frame.

Also, when the left-coordinate and the right-coordinate are supplied from the right-and-left-coordinate update section 95, the checking section 63 holds the newly supplied left-coordinate and right-coordinate, and updates the left-coordinate and the right-coordinate.

Referring back to the flowchart in FIG. 8, in step S45, the right-and-left-coordinate detection section 61 determines whether processing for one line of the input image of the current frame has been completed. For example, all the pixels constituting a line to be processed in the input image are the pixels to be processed. When the left-coordinate and the right-coordinate are output, it is determined that the processing for one line has been completed.

In step S45, if determined that the processing for one line has not been completed, the processing returns to step S41, and the above-described processing is repeated.

On the other hand, if determined that the processing for one line has been completed in step S45, in step S46, the flag generation section 96 generates the motion flag, V-cur, for each line on the basis of the motion flag, H-cur, supplied from the threshold-value processing section 92.

For example, if the motion flags, H-cur, of all the pixels constituting one line to be processed are "0", the flag generation section 96 generates a motion flag, V-cur, having a value of "0", which indicates that the line has no motion. Also, if there is even one pixel with a motion in the pixels constituting the line to be processed, that is to say, if there is even one pixel with a motion flag, H-cur, having a value of "1", the flag generation section 96 generates the motion flag, V-cur, having a value of "1", which indicates a line with a motion.

In this manner, the flag generation section 96 obtains whether there is a change in the pixel values of all the pixels constituting a line, that is to say, whether there is a change in the luminance component and the color-difference component of the entire line is obtained by the motion flags, H-cur, of individual pixels, and generates the motion flag, V-cur, for each line, which indicates whether there is the change.

When the flag generation section 96 has generates the motion flag, V-cur, the flag generation section 96 supplies the generated motion flag, V-cur, to the delay section 121 and the determination section 122 of the up-and-down coordinate detection section 62. Also, when the motion flag, V-cur, is supplied from the flag generation section 96, the delay section 121 holds the newly supplied motion flag, V-cur, and supplies the motion flag, V-cur, having been held so far, to the determination section 122 as the motion flag, V-pre.

In step S47, the determination section 122 compares the motion flag, V-cur, from the flag generation section 96 and the motion flag, V-pre, from the delay section 121, and outputs the up-coordinate and the down-coordinate of the input image of the current frame to the up-and-down coordinate update section 123.

For example, as shown in FIG. 14, the determination section 122 outputs the up-coordinate and the down-coordinate in accordance with states of the motion flag, V-cur, and the motion flag, V-pre, namely, a change in motion of the line to be processed. In this regard, in FIG. 14, columns, "V-pre" and "V-cur", show values of the motion flag, V-cur, and the motion flag, V-pre, respectively, and a column at the right side of those columns shows the up-coordinate or the down-coordinate, which are determined by the sates of individual motion flags.

Specifically, the determination section 122 holds the up-coordinate and the down-coordinate held at previous time. In this regard, if the up-coordinate and the down-coordinate have not been output, for example, a maximum value of an y-coordinate on an input image is set as an initial value of the up-coordinate, and a minimum value of an y-coordinate on an input image is set as an initial value of the down-coordinate. That is to say, the initial values of the up-coordinate and the down-coordinate are the lowermost and uppermost x-coordinates in FIG. 1.

If the values of the supplied motion flag, V-cur, and motion flag, V-pre, are "0", the determination section 122 does not update the up-coordinate and the down-coordinate, and directly outputs the held coordinate values as the up-coordinate and the down-coordinate.

Also, if the value of the motion flag, V-pre, is "0", and the value of the motion flag, V-cur, is "1", the determination section 122 holds and outputs the y-coordinate of the pixel to be processed as the up-coordinate, and the directly outputs the value of the held down-coordinate as the down-coordinate. In this case, only the up-coordinate is updated out of the up-coordinate and the down-coordinate held by the determination section 122.

Further, if the value of the motion flag, V-pre, is "1", and the value of the motion flag, V-cur, is "0", the determination section 122 directly outputs the held up-coordinate as a up-coordinate, and holds and outputs a value obtained by subtracting 1 from the y-coordinate of the pixel to be processed as a down-coordinate. In this case, only the down-coordinate out of the up-coordinate and the down-coordinate held by the determination section 122 is updated.

Further, if the values of the motion flag, V-cur, and the motion flag V-pre are "1", the determination section 122 does not update the up-coordinate and the down-coordinate, and directly outputs the held coordinate values as a up-coordinate and a down-coordinate.

Figures 15, 16, 17:
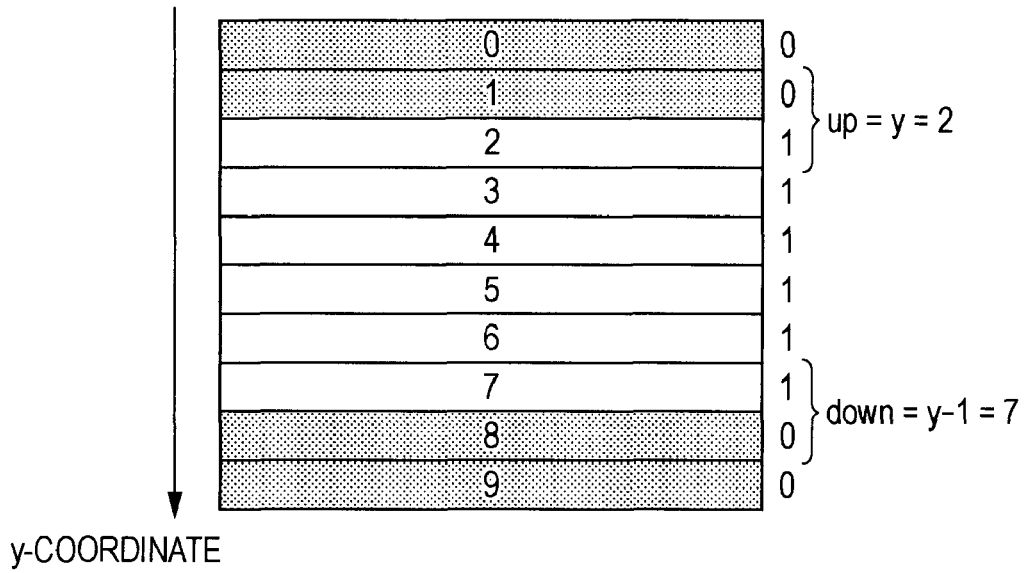
FIG. 15 is an explanatory diagram on detection of up-and-down coordinates.
FIG. 16 is an explanatory diagram on update of up-coordinates.
FIG. 17 is an explanatory diagram on update of down-coordinates.

Accordingly, for example, as shown in FIG. 15, y-coordinates of boundaries between a still-zone area and an effective area are output as an up-coordinate and a down-coordinate for each frame of an input image. In this regard, in FIG. 15, the down direction indicates a y-direction, and one rectangle represents one line. Also, a numeric value in each line shows an y-coordinate of the line, and a numeric value on the right side of the line indicates a value of the motion flag, V-cur, of the line, that is to say, whether there is a motion or not on the line.

In FIG. 15, it is assumed that lines having an y-coordinate of "0" to "1" and an y-coordinate of "8" to "9" are lines including only still-zone areas, and lines having a y-coordinate of "2" to "7" are lines including an effective area.

In the still-zone area, a same image is continuously displayed, that is to say, by consecutive frames, and thus the lines including only a still-zone area are still lines, and the motion flag, V-cur, of the pixel should be "0". On the other hand, in the effective area, the image of a content itself is displayed, and thus the lines including the effective area are basically lines with motion, and the motion flag, V-cur, of the line should be "1".

Accordingly, a position between a line whose motion flag, V-cur, is "0", and the line adjacent at the lower side to that line in the figure, whose motion flag, V-cur, is "1" becomes a boundary position between a still-zone area at the upper side in the figure and an effective area at the upper side. In the example in FIG. 15, the position between the line whose y-coordinate is "1" and the line whose y-coordinate is "2" becomes a boundary position between a still-zone area and an effective area.

In the same manner, a position between a line whose motion flag, V-cur, is "1", and the line adjacent at the lower side to that line in the figure, whose motion flag, V-cur, is "0" becomes a boundary position between a still-zone area at the lower side in the figure and an effective area in the y-direction. In the example in FIG. 15, the position between the line whose y-coordinate is "7" and the line whose y-coordinate is "8" becomes a boundary position between a still-zone area and an effective area.

Also, in the input image, a line to be processed is selected from a line having a low y-coordinate in sequence. Thus, in the figure, the motion flag, V-cur, of the line to be processed and the motion flag, V-pre, of the adjacent line at the upper side to that line are supplied to the determination section 122 from the upper-end to a lowermost line in sequence in the down direction.

Then, if the value of the motion flag, V-pre, is "0", and the value of the motion flag, V-cur, is "1", the determination section 122 determines that the position of the line to be processed is a boundary position in the y-direction, and outputs the y-coordinate of the line to be processed as an up-coordinate. That is to say, when the motion flag changes from "0" to "1", the boundary of the upper-side still-zone area in the figure is determined to be detected. In the example in FIG. 15, y=2 is output as the up-coordinate.

Also, if the value of the motion flag, V-pre, is "1", and the value of the motion flag, V-cur, is "0", the determination section 122 determines that the position of the line to be processed is a boundary position in the y-direction, and outputs a value of 1 subtracted from the y-coordinate of the line to be processed as a down-coordinate. That is to say, when the motion flag changes from "1" to "0", the boundary of the lower-side still-zone area in the figure is determined to be detected.

In the example in FIG. 15, when a line having an y-coordinate of "8" is to be processed, the lower-side boundary of the still-zone area in the figure is detected. Thus, the value of 1 subtracted from the y-coordinate of the line to be processed, namely a y-coordinate of "7", held by the line adjacent at the upper side to the line to be processed, is output as the down-coordinate.

In this manner, the determination section 122 compares the motion flags of two lines adjacent to each other in the y-direction. If the motion flags indicating whether there is a motion are different with each other, the position between the two lines is determined as a boundary position between a still-zone area and an effective area in the y-direction on the input image. And, the determination section 122 outputs an up-coordinate and a down-coordinate indicating the boundary positions to the up-and-down coordinate update section 123 as a candidate of an up-coordinate and a down-coordinate of the entire input image.

In this regard, there are sometimes pixels without a motion in an effective area. Thus, the positions of those lines are also output as candidates of the up-coordinate and the down-coordinate. That is to say, a plurality of candidates of the up-coordinate and the down-coordinate may be detected from the input image of one frame.

Also, more specifically, if the y-coordinate of the line to be processed is "0", that is to say, a line of a new frame is to be processed, the determination section 122 does not compare the motion flags, and directly outputs the held up-coordinate and down-coordinate to the up-and-down coordinate update section 123. Also, the up-coordinate and down-coordinate held by the determination section 122 is reset to an initial value for each one frame.

Referring back to the description of the flowchart in FIG. 8, in step S48, the up-and-down coordinate update section 123 updates the held up-coordinate and down-coordinate on the basis of the up-coordinate and the down-coordinate supplied from the determination section 122, and supplies the updated up-coordinate and down-coordinate to the checking section 63.

For example, the up-and-down coordinate update section 123 holds the previous up-coordinate and down-coordinate, compares the held up-coordinate and down-coordinate with the up-coordinate and down-coordinate newly supplied from the determination section 122 this time, and updates the held up-coordinate and down-coordinate.

Specifically, as shown in FIG. 16, the up-and-down coordinate update section 123 updates the up-coordinate in accordance with the comparison between the held up-coordinate and the supplied up-coordinate. In this regard, in FIG. 16, "up-cur" represents a newly supplied up-coordinate, and "up-pre" represents the up-coordinate held by the up-and-down coordinate update section 123. Also, FIG. 16 shows an up-coordinate output by the comparison between "up-cur" and "up-pre".

That is to say, if the newly supplied up-coordinate, "up-cur", is higher than the held up-coordinate, "up-pre", the up-and-down coordinate update section 123 outputs the held up-coordinate, "up-pre", to the checking section 63, and continuously holds the up-coordinate, "up-pre".

Also, if the newly supplied up-coordinate, "up-cur", is not higher than the held up-coordinate, "up-pre", the up-and-down coordinate update section 123 outputs the newly supplied up-coordinate, "up-cur", to the checking section 63, updates the up-coordinate to "up-cur", and holds the up-coordinate, "up-cur".

Accordingly, for example, if a new up-coordinate less than the held up-coordinate is supplied, the up-and-down coordinate update section 123 updates the up-coordinate.

The lines including only a still-zone area are lines without a motion in any frames, and thus one of the lines adjacent to each other in the still-zone area will not become a line with a motion. Accordingly, among the y-coordinates supplied to the up-and-down coordinate update section 123 as candidates of the up-coordinate, a y-coordinate nearest to the uppermost edge of the input image in the figure has a highest possibility of the up-coordinate indicating a boundary position of the still-zone area. Then, it is possible to more correctly detect an up-coordinate by outputting a candidate of the up-coordinate indicating a lowest y-coordinate as the up-coordinate. That is to say, it is possible to more reliably detect the up-coordinate of the still-zone area.

Further, in the same manner as an up-coordinate, as shown in FIG. 17, the up-and-down coordinate update section 123 updates the down-coordinate in accordance with the comparison between the held down-coordinate and the supplied down-coordinate. In this regard, in FIG. 17, "down-cur" represents a newly supplied right-coordinate, and "down-pre" represents the down-coordinate held by the up-and-down coordinate update section 123. Also, FIG. 17 shows a down-coordinate output by the comparison between "down-cur" and "down-pre".

That is to say, if the newly supplied up-coordinate, "down-cur", is higher than the held left-coordinate, "down-pre", the up-and-down coordinate update section 123 outputs the held right-coordinate, "right-pre", to the checking section 63. And the up-and-down coordinate update section 123 updates the down-coordinate to "down-cur", and holds the down-coordinate, "down-cur". That is to say, the down-coordinate, "down-cur", is held as the next down-coordinate, "down-pre".

Also, if the newly supplied down-coordinate, "down-cur", is not higher than the held down-coordinate, "down-pre", the up-and-down coordinate update section 123 outputs the newly supplied down-coordinate, "down-cur", to the checking section 63, and continuously holds the down-coordinate, "down-pre".

In this manner, in the same manner as the case of the up-coordinate, among the y-coordinates supplied to the up-and-down coordinate update section 123 as candidates of the down-coordinate, the up-and-down coordinate update section 123 outputs a y-coordinate nearest to the end in the y-direction of the input image as the down-coordinate. Thereby, it is possible to more correctly detect a down-coordinate. That is to say, it is possible to more reliably detect the down-coordinate of the still-zone area.

Also, at the time of detecting the up-coordinate and the down-coordinate, whether there is a motion of a pixel has already obtained for all the pixels of the input image. Thus, the up-and-down coordinate detection section 62 detects the up-coordinate and the down-coordinate for each line of the input image. Thereby, it is possible to detect boundary positions with a fewer amount of processing and more faster than the case of detecting boundary positions of the still-zone area and the effective area for each pixel.

In this regard, the up-coordinate, "up-pre", and the down-coordinate, "down-pre", held by the up-and-down coordinate update section 123 are reset for each one frame. That is to say, when all the lines in the input image of one frame are processed, the right-and-left-coordinate update section 95 discards the held up-coordinate, "up-pre", and down-coordinate, "down-pre". And, the up-and-down coordinate update section 123 outputs the up-coordinate, "up-cur", and the down-coordinate, "down-cur", of the pixel of the newly supplied next frame, and holds and up-coordinate, "up-cur", and the down-coordinate, "down-cur", as the up-coordinate, "up-pre", and the down-coordinate, "down-pre".

Accordingly, all the lines in the input image of one frame are to be processed. The up-coordinate and the down-coordinate finally (at the last time) output from the up-and-down coordinate update section 123 are the coordinates of the boundary candidates of the still-zone area, located at a position, nearest to the end in the y-direction, of the input image of the frame.

Also, when the up-coordinate and the down-coordinate are supplied from the up-and-down coordinate update section 123, the checking section 63 holds the newly supplied up-coordinate and down-coordinate, and updates the up-coordinate and the down-coordinate.

Referring back to the flowchart in FIG. 8, in step S49, the up-and-down coordinate detection section 62 determines whether processing of the input image for one frame has been completed. For example, all the lines constituting the input image to be processed are the pixels to be processed. When the up-coordinate and the down-coordinate are output, it is determined that the processing for one frame has been completed.

In step S49, if determined that the processing for one line has not been completed, the processing returns to step S41, and the above-described processing is repeated.

On the other hand, if determined that the processing for one line has been completed in step S49, in step S50, the checking section 63 checks the still-zone area coordinates supplied from the right-and-left-coordinate update section 95 and the up-and-down coordinate update section 123 and held.

That is to say, if the held left-coordinate, right-coordinate, up-coordinate, and down-coordinate still have the initial values as the held still-zone area coordinates, the checking section 63 determines that the still-zone area coordinates have failed to be correctly detected, and uses predetermined coordinates as the still-zone area coordinates. As described above, the initial values of the left-coordinate, right-coordinate, up-coordinate, and down-coordinate are set to, for example, a maximum value of an x-coordinate, a minimum value of an x-coordinate, a maximum value of a y-coordinate, and a minimum value of a y-coordinate, respectively.

If the checking section 63 determines that the still-zone area coordinates has not been correctly detected as a result of the checking, for example, a minimum value and a maximum value of an x-coordinate of a pixel of the input image are used as the left-coordinate and the right-coordinate of the input image. Specifically, the x-coordinates of the left-side end and the right-side end of the input image in FIG. 1 are used as the left-coordinate and the right-coordinate. Also, for example, a minimum value and a maximum value of a y-coordinate of a pixel of the input image are used as the up-coordinate and the down-coordinate of the input image. Specifically, the y-coordinates of the up-side end and the down-side end of the input image in FIG. 1 are used as the up-coordinate and the down-coordinate. And the still-zone area coordinates obtained in this manner are determined to be the still-zone area coordinates of the current frame, and are output to the delay section 32.

Also, if the held left-coordinate, right-coordinate, up-coordinate, and down-coordinate as the still-zone area coordinates are different from the initial values, the checking section 63 determines that the still-zone area coordinates have been correctly detected, and outputs the held still-zone coordinates to the delay section 32 as the still-zone area coordinates of the current frame.

The delay section 32 holds the still-zone area coordinates supplied from the checking section 63 for a predetermined time period, and supplies the supplied still-zone area coordinates of the current frame, and the still-zone area coordinates for the past four frames to the filter processing section 33.

In step S51, the filter processing section 33 outputs the final still-zone area coordinates of the current frame on the basis of the still-zone area coordinates for five frames, which have been supplied from the delay section 32. That is to say, the filter processing section 33 performs filter processing on the supplied still-zone area coordinates using a median filter, and determines individual medians of the five left-coordinates, right-coordinates, up-coordinates, and down-coordinates to be the final left-coordinate, right-coordinate, up-coordinate, and down-coordinate. Thereby, it is possible to restrain the variations of the output still-zone area coordinates in time. That is to say, a still-zone area will not fluctuate greatly for each frame.

After performing the filter processing on the still-zone area coordinates, the filter processing section 33 supplies the still-zone area coordinates obtained as a result to the motion-vector detection section 23 and the motion compensation section 24 as the final still-zone area coordinates of the current frame, and the still-zone area detection processing is completed. And the processing proceeds to step S12 in FIG. 6 after that.

In this manner, the still-zone area detection section 22 detects the left-coordinate and the right-coordinate on the basis of a change in a motion of each pixel, and detects the up-coordinate and the down-coordinate on the basis of a change in a motion of each line so as to detect a still-zone area from an input image.

In this manner, a still-zone area is detected on the basis of changes in a motion of a pixel and a line using the characteristic in that a same image is continuously displayed in a still-zone area. Thereby, it is possible to reliably detect a still-zone area from an input image without depending on what kinds of image is displayed in the still-zone area.

That is to say, even if an image having any design, such as a black image or an image having a specific design, etc., is displayed in a still-zone area, there is no motion in a pixel or a line of the still-zone area. Accordingly, it is possible to identify a still-zone area more reliably by comparing whether pixels or lines, adjacent with each other, has a motion using such a characteristic.

Furthermore, the still-zone area detection section 22 delays the supplied input image, and detects a still-zone area more quickly by the simple processing using the absolute difference value of the individual pixels between the current frame and the past frame. That is to say, it is possible to detect a still-zone area more easily and more quickly by performing each processing on the pixels of the input image in sequence without necessitating a state machine having much processing, etc.

In this regard, in the above, a description has been given of an example of detecting a still-zone area from an input image, and of performing frame-rate conversion only on an effective area. However, the above-described technique of detecting a still-zone area can also be applied to the case of extracting and displaying only an effective area of an input image.

Also, in addition to this, the technique of detecting a still-zone area can also be applied to the case of scaling only an effective area, the case of recording only an effective area in a recording apparatus, the case of correcting image quality of only an effective area by a mobile device, the case of matching the edges of a still-zone area with a compression block in a compression system, etc. In particular, in the case of correcting the image quality of only an effective area in a mobile device, it becomes possible to drastically restrain power consumption of the mobile device.

The above-described series of processing can be executed by hardware or by software. When the series of processing is executed by software, programs constituting the software may be installed in a computer built in a dedicated hardware. Alternatively, the programs may be installed from a program recording medium, for example in a general-purpose personal computer, etc., capable of executing various functions by installing various programs.

FIG. 18 is a block diagram illustrating an example of a hardware configuration of a computer which executes the above-described series of processing by programs.

In the computer, a CPU (Central Processing Unit) 201, a ROM (Read Only Memory) 202, a RAM (Random Access Memory) 203 are mutually connected through a bus 204.

An input/output interface 205 is also connected to the bus 204. An input section 206 including a keyboard, a mouse, a microphone, etc., an output section 207 including a display, a speaker, etc., a storage section 208 including a hard disk, a nonvolatile memory, etc., a communication section 209 including a network interface, etc., and a drive 210 for driving a removable medium 211, such as a magnetic disk, an optical disc, a magneto-optical disc, or a semiconductor memory, etc., are connected to the input/output interface 205.

In the computer having the configuration as described above, the CPU 201 loads the program stored, for example in storage section 208 to the RAM 203 through the input/output interface 205 and the bus 204 to execute the program, and thereby the above-described series of processing is performed.

The program to be executed by the computer (CPU 201) is recorded in a removable medium 211, which is a package medium including, such as a magnetic disk (including a flexible disk), an optical disc (including a CD-ROM (Compact Disc-Read Only Memory), a DVD (Digital Versatile Disc), etc.), a magneto-optical disc, or a semiconductor memory, etc. Alternatively, the program may be provided through wired or wireless transmission, such as a local area network, the Internet, a digital satellite broadcasting, etc.

The program can be installed in the storage section 208 through the input/output interface 205 by attaching the removable medium 211 to the drive 210. Also, the program can be received by the communication section 209 through a wired or wireless transmission medium and can be installed in the storage section 208. In addition, the program may be installed in the ROM 202 or the storage section 208 in advance.

In this regard, the programs executed by the computer may be programs that are processed in time series in accordance with the described sequence in this specification. Alternatively, the programs may be the programs to be executed in parallel or at necessary timing, such as at the time of being called, or the like.

The present application contains subject matter related to that disclosed in Japanese Priority Patent Application JP 2008-319465 filed in the Japan Patent Office on Dec. 16, 2008, the entire content of which is hereby incorporated by reference.

In this regard, an embodiment of the present invention is not limited to the above-described embodiments. It is possible to make various changes without departing from the gist of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus detecting, from an input image, a still-zone area disposed at an edge of the input image and displaying a same image continuously, the apparatus comprising:

a difference calculation means for calculating a difference between pixel values of pixels located at a same position of the input image in different frames with each other for each pixel of the input image;

a pixel-motion-information generation means for generating pixel-motion information indicating whether there is a change in the pixel values of the pixels of the input image on the basis of the difference;

a first detection means for comparing the pixel-motion information of a plurality of the pixels arranged in a first direction in the input image, and detecting a boundary position in the first direction between the still-zone area and an effective area excluding the still-zone area in the input image;

a line-motion-information generation means for generating line-motion information indicating whether there is a change in a pixel value of a pixel constituting a line including pixels arranged in the first direction in the input image; and a second detection means for comparing the line-motion-information of a plurality of the lines arranged in a second direction perpendicular to the first direction in the input image, and detecting a boundary position in the second direction between the still-zone area and an effective area excluding the still-zone area in the input image.

2. The image processing apparatus according to claim 1, wherein if whether there is a change in the pixel value indicated by each of the pixel-motion information of two adjacent pixels in the first direction is different with each other, the first detection means detects a position of the two pixels as a position of a boundary in the first direction.

3. The image processing apparatus according to claim 2, further comprising, on the basis of a plurality of positions detected by the first detection means, a first output means for outputting a position nearest to an end of the input image in the first direction out of the plurality of positions as a position of a boundary in the first direction.

4. The image processing apparatus according to claim 3, wherein if whether there is a change in the pixel value indicated by each of the line-motion information of two adjacent lines in the second direction is different with each other, the second detection means detects a position of the two lines as a position of a boundary in the second direction.

5. The image processing apparatus according to claim 4, further comprising, on the basis of a plurality of positions detected by the second detection means, a second output means for outputting a position nearest to an end of the input image in the second direction out of the plurality of positions as a position of a boundary in the second direction.

6. The image processing apparatus according to claim 1, further comprising:
- a motion-vector detection means for detecting a motion vector from the effective area of the input image on the basis of the boundary position in the first direction and the boundary position in the second direction; and
- a motion-compensation means for performing motion compensation on the effective area of the input image on the e basis of the boundary position in the first direction, the boundary position in the second direction, and the motion vector, and converting a frame rate of the input image.

7. The image processing apparatus according to claim 1, further comprising a filter processing means for performing filter processing on a plurality of the boundary positions in the first direction and the boundary positions in the second direction obtained for the input image of each frame, and restraining variations in time of the boundary positions in the first direction and the boundary positions in the second direction.

8. A method of processing an image in an image processing apparatus for detecting, from an input image, a still-zone area disposed at an edge of the input image and displaying a same image continuously, the apparatus including: a difference calculation means for calculating a difference between pixel values of pixels located at a same position of the input image in frames different with each other for each pixel of the input image; a pixel-motion-information generation means for generating pixel-motion information indicating whether there is a change in the pixel values of the pixels of the input image on the basis of the difference; a detection means for comparing the pixel-motion information of a plurality of the pixels arranged in a predetermined direction, and detecting a boundary position in the predetermined direction between the still-zone area and an effective area excluding the still-zone area in the input image; a line-motion-information generation means for generating line-motion information indicating whether there is a change in a pixel value of a pixel constituting a line including pixels arranged in the first direction in the input image; and a second detection means for comparing the line-motion-information of a plurality of the lines arranged in a second direction perpendicular to the first direction in the input image, and detecting a boundary position in the second direction between the still-zone area and an effective area excluding the still-zone area in the input image, the method comprising the steps of:
- the difference calculation means calculating a difference between pixel values of the pixels of the input image;
- the pixel-motion-information generation means generating pixel-motion information on the basis of the difference;
- the detection means comparing the pixel-motion information of the plurality of the pixels, and detecting a boundary position in the predetermined direction;
- the line-motion-information generation means generating line-motion information indicating whether there is a change in a pixel value of a pixel constituting a line including pixels arranged in the first direction in the input image; and
- the second detection means comparing the line-motion-information of a plurality of the lines arranged in a second direction perpendicular to the first direction in the input image, and detecting a boundary position in the second direction between the still-zone area and an effective area excluding the still-zone area in the input image.

9. A non-transitory computer readable medium having stored there on an image processing program for detecting, from an input image, a still-zone area disposed at an edge of the input image and displaying a same image continuously, the program for causing a computer to perform processing comprising the steps of:
- calculating a difference between pixel values of pixels located at a same position of the input image in frames different with each other for each pixel of the input image;
- generating pixel-motion information indicating whether there is a change in the pixel values of the pixels of the input image on the basis of the difference;
- comparing the pixel-motion information of a plurality of the pixels arranged in a predetermined direction in the input image, and detecting a boundary position in the predetermined direction between the still-zone area and an effective area excluding the still-zone area in the input image;
- generating line-motion information indicating whether there is a change in a pixel value of a pixel constituting a line including pixels arranged in the first direction in the input image; and
- comparing the line-motion-information of a plurality of the lines arranged in a second direction perpendicular to the first direction in the input image, and detecting a boundary position in the second direction between the still-zone area and an effective area excluding the still-zone area in the input image.

10. An image processing apparatus detecting, from an input image, a still-zone area disposed at an edge of the input image and displaying a same image continuously, the apparatus comprising:
- a difference calculation mechanism calculating a difference between pixel values of pixels located at a same position of the input image in different frames with each other for each pixel of the input image;
- a pixel-motion-information generation mechanism generating pixel-motion information indicating whether there is a change in the pixel values of the pixels of the input image on the basis of the difference;
- a first detection mechanism comparing the pixel-motion information of a plurality of the pixels arranged in a first direction in the input image, and detecting a boundary position in the first direction between the still-zone area and an effective area excluding the still-zone area in the input image;
- a line-motion-information generation mechanism generating line-motion information indicating whether there is a change in a pixel value of a pixel constituting a line including pixels arranged in the first direction in the input image; and
- a second detection mechanism comparing the line-motion-information of a plurality of the lines arranged in a second direction perpendicular to the first direction in the input image, and detecting a boundary position in the second direction between the still-zone area and an effective area excluding the still-zone area in the input image.

* * * * *